United States Patent [19]

Thomson

[11] Patent Number: 5,754,033

[45] Date of Patent: May 19, 1998

[54] CONTROL SYSTEM AND CIRCUITS FOR DISTRIBUTED ELECTRICAL-POWER GENERATING STATIONS

[75] Inventor: William R. Thomson, Anchorage, Ak.

[73] Assignee: Alaska Power Systems Inc., Anchorage, Ak.

[21] Appl. No.: 615,688

[22] Filed: Mar. 13, 1996

[51] Int. Cl.[6] .................................................. H02P 9/00
[52] U.S. Cl. ............................ 322/45; 364/510; 307/57
[58] Field of Search ........................... 322/47, 22, 25; 290/40 B, 40 C, 52

[56] References Cited

U.S. PATENT DOCUMENTS

| | | | |
|---|---|---|---|
| 4,322,630 | 3/1982 | Mezera et al. | 290/40 C |
| 4,428,349 | 1/1984 | Snow | 123/493 |
| 4,477,765 | 10/1984 | Glennon et al. | 322/20 |
| 4,496,286 | 1/1985 | Gagnon | 417/22 |
| 4,508,077 | 4/1985 | Shimbara | 123/357 |
| 4,629,968 | 12/1986 | Butts et al. | 322/29 |
| 4,659,977 | 4/1987 | Kissel et al. | 320/64 |
| 4,668,872 | 5/1987 | Lerouge et al. | 290/40 R |
| 4,731,547 | 3/1988 | Alenduff et al. | 307/85 |
| 5,092,302 | 3/1992 | Mohan | 123/497 |
| 5,168,208 | 12/1992 | Schultz et al. | 322/23 |
| 5,294,879 | 3/1994 | Freeman et al. | 322/25 |
| 5,315,229 | 5/1994 | Markus | 322/28 |
| 5,325,043 | 6/1994 | Parro | 322/25 |
| 5,361,216 | 11/1994 | Warn et al. | 364/510 |

OTHER PUBLICATIONS

Electronics Engineers' Handbook by Fink, First Edition, 1975.

Primary Examiner—Clayton E. Laballe
Assistant Examiner—Nicholas Ponomarenko
Attorney, Agent, or Firm—R. Russel Austin

[57] ABSTRACT

A system (30) for providing electrical-power to remote communities (34) widely distributed over an extended geographical area (38) includes a generating station (32) located proximate each of the communities, each generating station supplying only that community to which it is proximate. The generating stations are in electronic communication with a central computer (40). Each generating station includes a plurality of generators (54-56). Each of the generators is controlled by a microprocessor based controller (64). Each controller is arranged to operate the generating station cooperatively with the other controllers associated with other generators in the station, and to assume a supervisory role in doing so by a mutual arbitration procedure among the controllers. Each controller is also arranged to monitor important generator operating parameters and to communicate these parameters to the central computer. Any controller may be reprogrammed by instructions communicated from the central computer, and functions of any controller may be overridden by instructions communicated from the central computer. The controllers include novel signal processing circuits (90 and 85) and logic for improved voltage and frequency regulation. The controllers also include novel circuits (92) and logic for monitoring generator fuel consumption and calculating generator fuel-efficiency therefrom.

3 Claims, 25 Drawing Sheets

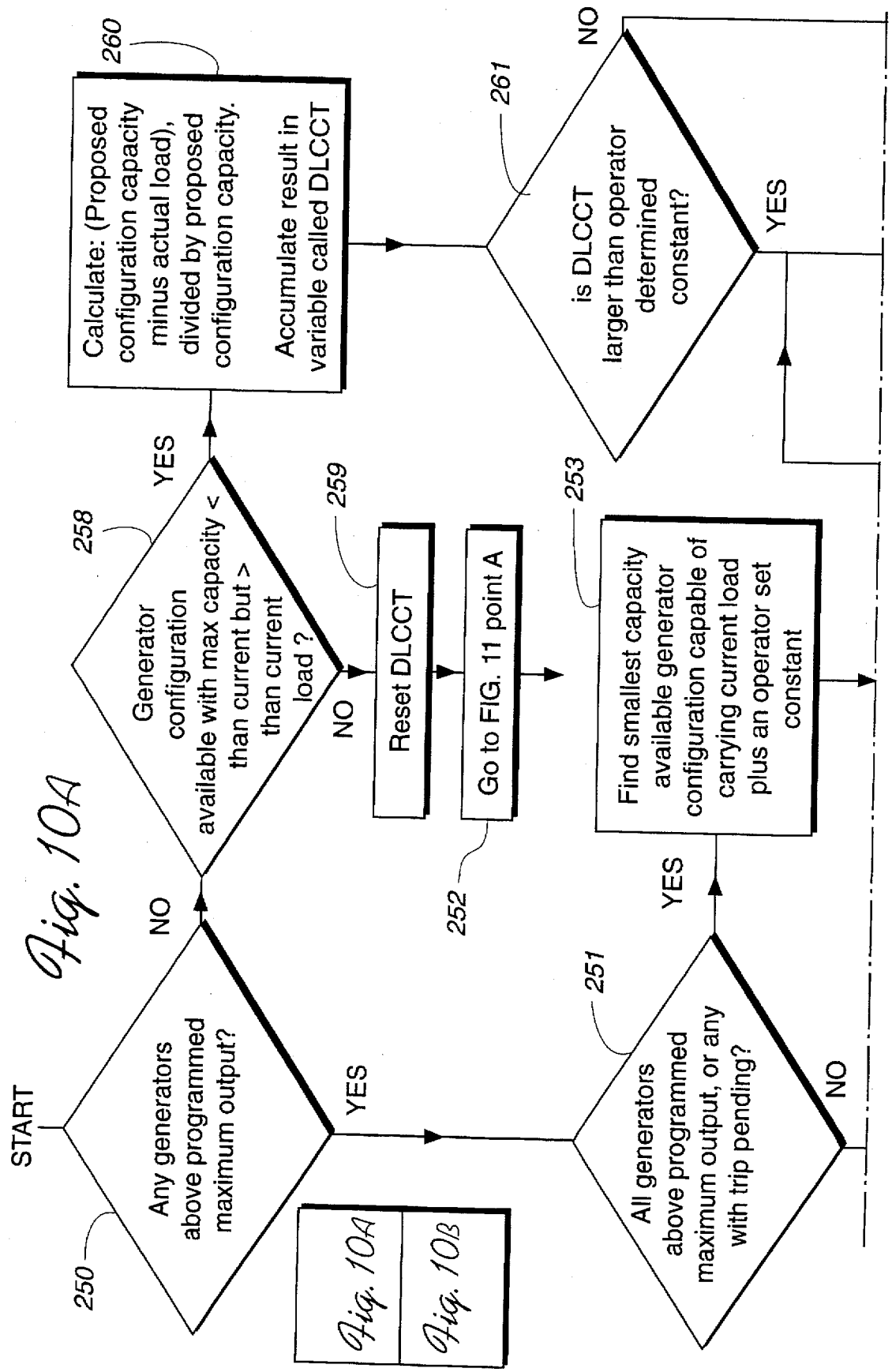

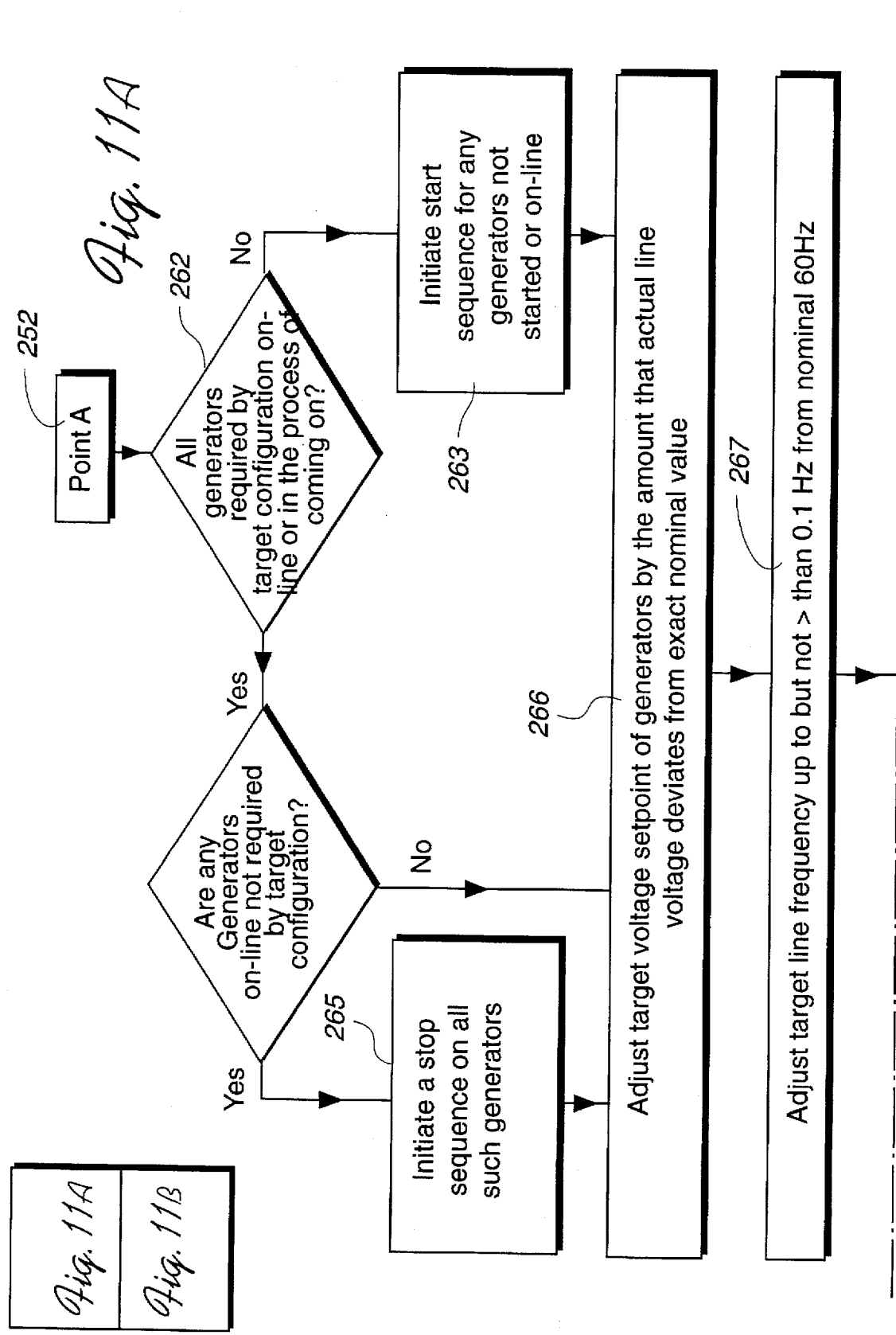

If cranking wait: ⟵ 304

Turn on only the fuel solenoid relay.

Wait until inter-crank time is reached, then see if crank count is equal to the preset permissible number of cranks, if yes, then go to tripped on failure to start. If another crank is still allowed, then go back to cranking.

If speed is now above the preset threshold, switch to coming-up-to-speed.

Otherwise:
Change mode to out-of-service if breaker is opened.
Change mode to out-of-service if stop is pushed.
Change mode to out-of-service if remote stop request is received.

If coming-up-to-speed: ⟵ 306

Turn on only the fuel solenoid relay.

If nominal speed is reached, switch to stand-alone mode.

Otherwise:
Change mode to out-of-service if breaker is opened.
Change mode to out-of-service if stop is pushed.
Change mode to out-of-service if remote stop request is received.

If stand-alone running: ⟵ 308

Turn on only the fuel solenoid relay.

If syncing only flag is set, then immediately change mode to synchronizing.

Otherwise:
Change mode to cool-down if breaker is opened.
Change mode to cool-down if stop is pushed.
Change mode to synchronizing if allowed and start pushed.
Change mode to synchronizing if allowed and remote start received.
Change mode to cool-down if synchronizing is allowed and this mode is run longer than the preset maximum time.

If synchronizing: ⎯ 310

Turn on only the fuel solenoid relay.

If the time in this mode is greater than the preset maximum time allowed, then go to tripped on failure to synchronize.

If the line is dead and closure to a dead line is allowed, then switch to on-line after a preset time delay.

If the instantaneous voltage difference between the alternator output and the line is less than a preset threshold, then increment a slip count, if not low enough, then reset the slip count. When the slip count is above a preset threshold, the relative frequency difference is guaranteed low enough for synchronization, one of the three required criteria for synchronizing.

If the difference in voltage magnitude between the alternator output and the line is low enough, the second required criteria for synchronizing is met.

If the phase angle between the alternator waveform and the line waveform is less than a preset maximum, then the relative phase is sufficiently close. This is the third and last requirement for synchronization.

If all three criteria are met, change mode to on-line.

Otherwise:
Change mode to out-of-service if breaker is opened.
Change mode to out-of-service if stop is pushed.
Change mode to out-of-service if remote stop is received.

If on-line: ⎯ 312

Turn on the fuel solenoid relay and the line contactor relay.

Change mode to cool-down if breaker is opened.
Change mode to unloading if stop is pushed.
Change mode to unloading if remote stop is received.
Change mode to cool-down if synchronization lost for some external reason.

If unloading: ⎯ 314

Turn on the fuel solenoid relay and the line contactor relay.

Allow 1 minute for load to transfer to another generator, then switch to cool-down mode.

Change mode to cool-down if breaker is opened.
Change mode to cool-down if remote stop is received.
Change mode back to on-line if start pushed or remote start signal received.

FROM
314

If cool-down: ⎡ 316
Turn on only the fuel solenoid relay.
Allow a preset time in cool-down before switching to ready mode.

Otherwise:
Change mode to coming-up-to-speed if start is pushed.
Change mode to coming-up-to-speed if remote start is received.

RETURN

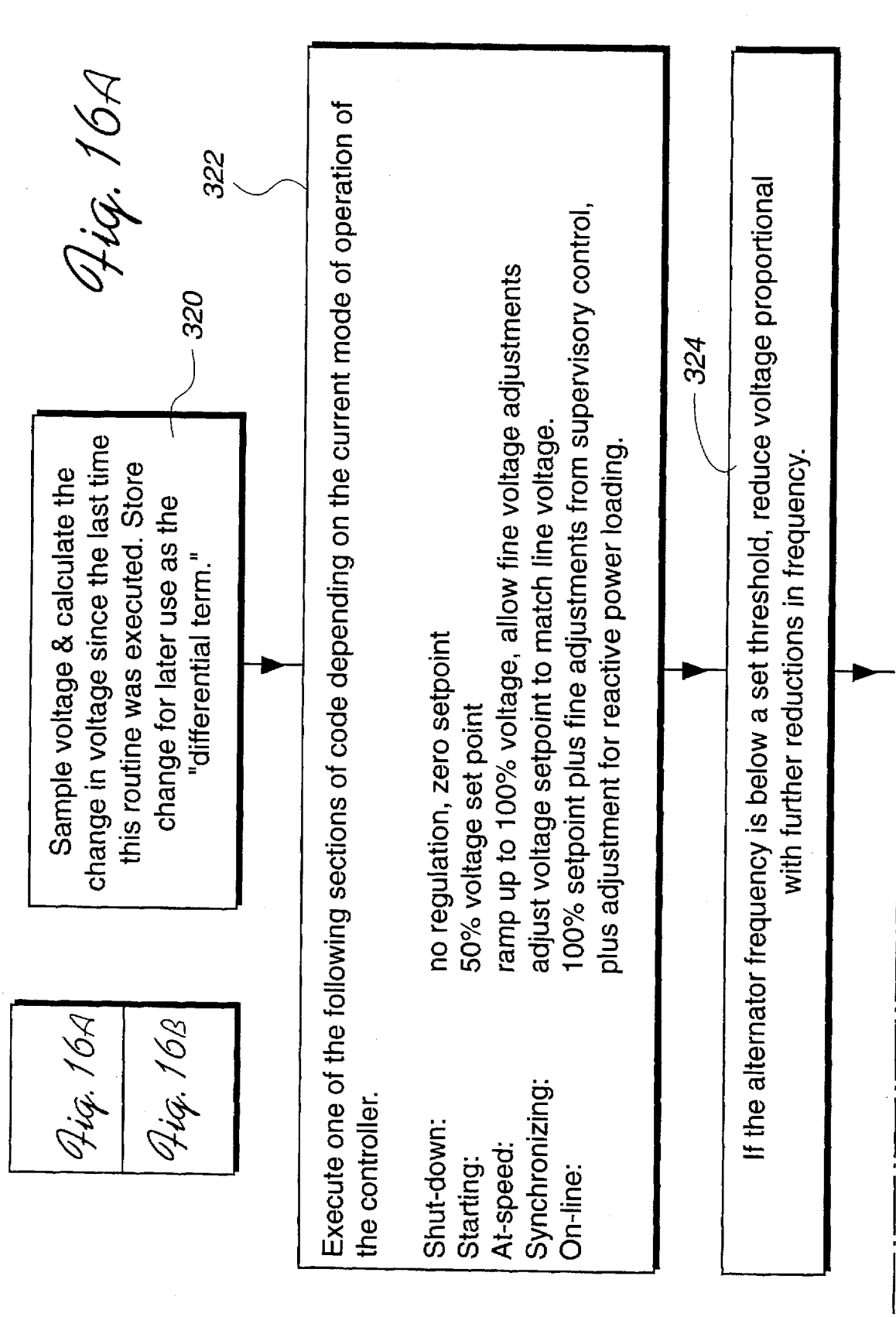

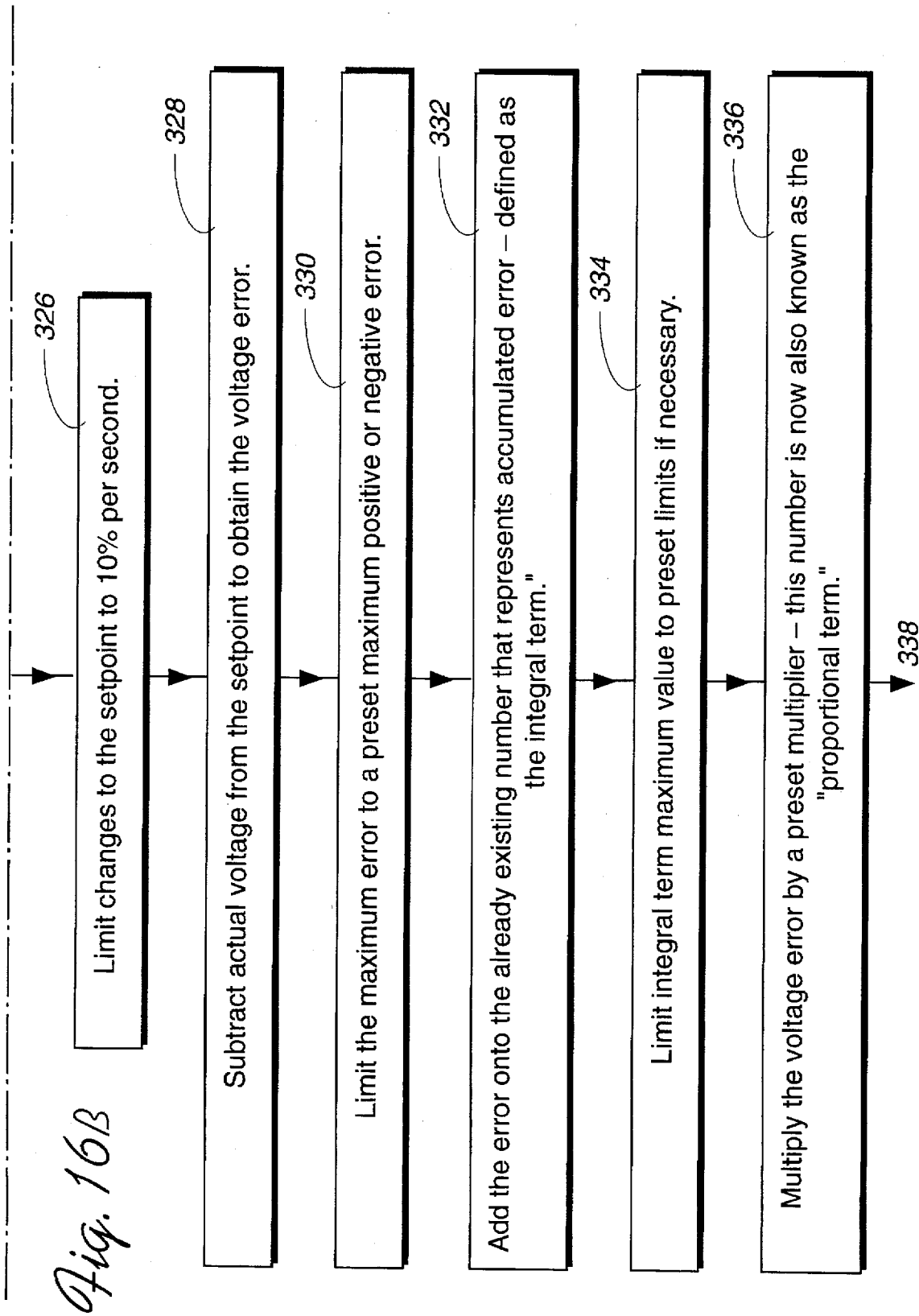

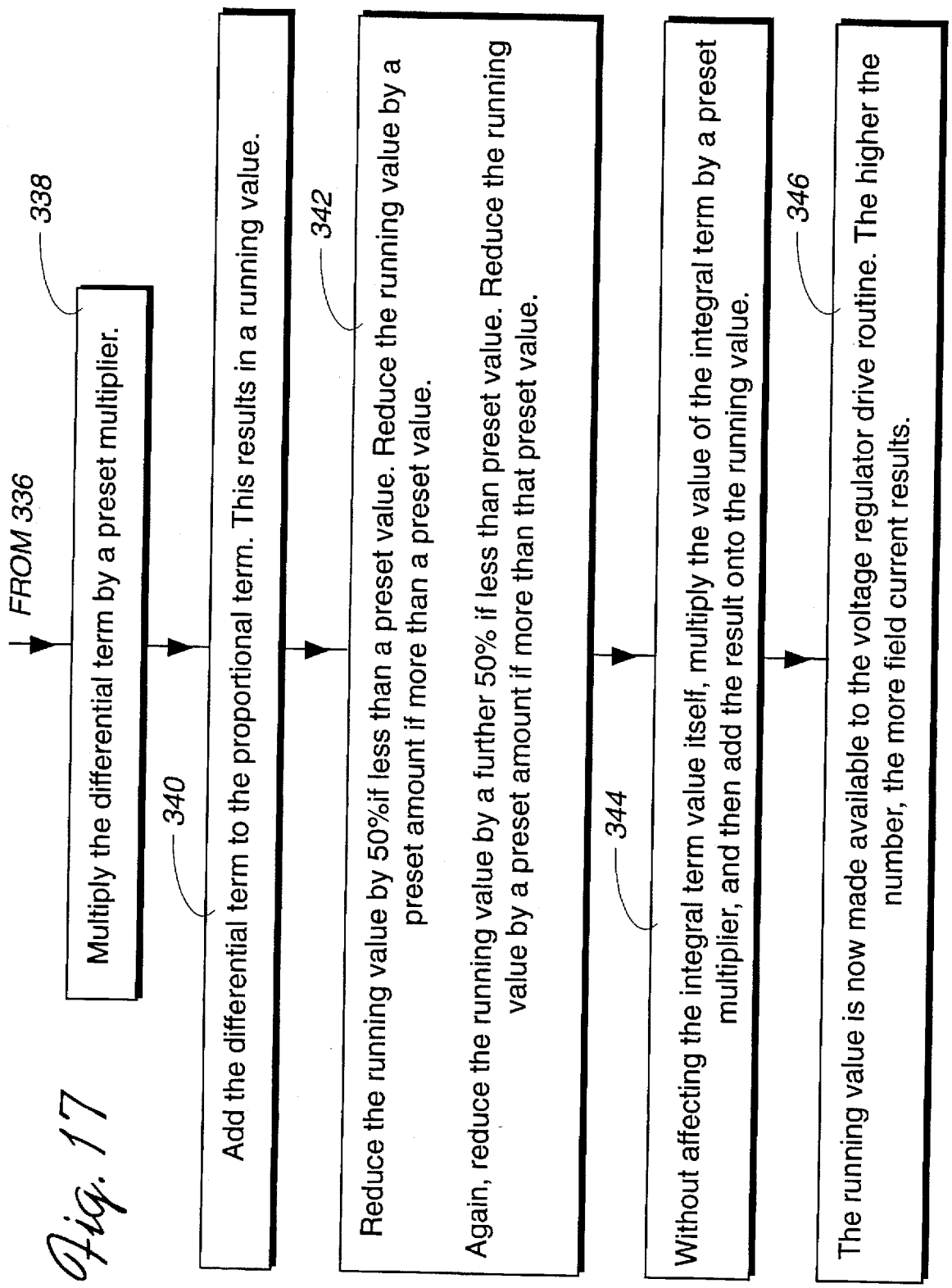

350 — Determine which frequency source to use – if either alternator voltage or magnetic pick-up frequency is below preset values, use the magnetic pick-up frequency if this device is connected. Otherwise calculate the frequency using the mathematical inverse of the measured time between zero-crossings of the alternator voltage output.

352 — Execute one of the following sections of code depending on the current mode of operation of the controller.

Shut-down: no governing, actuator shut down.
Starting: 100% frequency set point.
At-speed: 100% frequency setpoint, allow fine speed adjustments.
Synchronizing: adjust frequency and relative phase to match the line voltage.
On-line: 100% setpoint plus fine adjustments from supervisory control, plus droop adjustment for power loading.
Unloading: load 98% frequency setpoint to force the load to transfer to other gen-sets.
Cooling-down: 50% frequency setpoint.

CONTROL SYSTEM AND CIRCUITS FOR DISTRIBUTED ELECTRICAL-POWER GENERATING STATIONS

TECHNICAL FIELD OF THE INVENTION

The present invention relates in general to automatic control of electrical power generators. It relates in particular to a system including a plurality of generators which together provide power for a user group or community, each of the generators including a microcomputer based controller, and the controllers in electronic communication with each other for cooperatively and autonomously controlling the generator group, with an arbitrarily determined one of the controllers supervising the operations of the others at any instant, and in electronic communication with a central computer for reporting performance data thereto and receiving operating instructions therefrom.

DISCUSSION OF BACKGROUND ART

There are remote areas of the world which, however remote they may be, support many small communities. These are typically widely distributed over a large area and are not interconnected by a system of paved highways or a distribution system for utilities such as water and power. In such a small community, utilities must be self provided by residents or businesses or may be derived from a small centralized utility system located in or close to the community. Electricity generators in such a community may be of several different types including water, wind and diesel-engine driven generators.

Diesel-engine driven generators are most common, yet such generators often present a most difficult maintenance problem, requiring intricate adjustments to maintain them at a reasonable operating efficiency or running reliably. Further, an electrical generation station generally relies on two or more generators. These generators may be of different capacity to deal with differing load requirements, which may vary hourly, daily, or seasonally. Typically, at least one back-up generator is required to maintain power in the event that a primary generator is stopped, for example, through failure, or in order to perform maintenance on the generator.

One significant problem is predicting fuel requirements and maintaining a fuel supply sufficient that power supply continues without interruption. This may result in excessive amounts of fuel being stored. Storing large amounts of fuel requires correspondingly large, long-term commitment of funds, with attendant interest costs. Storing and transporting large amounts of fuel may also be environmentally hazardous, particularly in remote regions which experience extreme weather conditions, for example, Alaska. Storing large amounts of fuel may mean that a community is not able to take advantage of any advantageous fuel price fluctuations.

Another significant problem is maintaining a sufficient quality, consistency, and continuity of power. As many of the above discussed small communities now rely on electronic computers, computer-controlled devices, and digital communications, it is important that a power source be available which provides a consistent narrow range of voltage and frequency, as such electronic devices may be sensitive to even relatively small power fluctuations.

In most circumstances, a small remote community will not have rapid access to skilled technical help which may be required to properly maintain one generator, let alone a system of electrical generators. Transporting such help to a remote location significantly adds to the cost of the help. Maintaining resident skilled personnel in a community is also expensive, particularly if maintenance is only required intermittently.

Microcomputer controlled devices have been devised, which are capable of automatically providing basic generator controls such as voltage and speed (frequency) control. Devices have also been devised which can provide automatic switching to a stand-by generator in the event of sudden impending failure of a primary generator, or switching of a load from one generator to another in the event of a load fluctuation. As the power requirements of small remote communities increase there is an increasing need for means to provide power to such communities via local generating stations which are capable of a high level of autonomous control and self-maintenance, but which may be monitored and controlled, alone or as part of a group, from a remote location.

SUMMARY OF THE INVENTION

The present invention is directed to providing an electrical power generator control system which is capable of automatically controlling and operating a plurality of electrical power generators. In one particular aspect, the invention is directed to enabling a remotely located central operator or computer to monitor and control a system of automatically controlled and supervised generating units or stations, each including at least one electrical power generator, and which are distributed over a geographical region. The generating stations may be autonomously controlled by a microprocessor based controller therein which is programmed for optimally operating the generating station to generate electrical power; for monitoring selected operating parameters of the electrical power generator; and for transmitting the selected operating parameters to the central computer. The generating stations are also remotely monitorable and controllable from the central computer via an electronic telecommunications link with the microcomputer based controller.

In another aspect of the present invention, one or more of the plurality of the generating stations may include a plurality of electrical power generators which are cooperatively operated to supply a common electrical load or demand. Each of the generators in such stations includes a microcomputer based controller. Each microcomputer based controller includes means for electronically storing target operational parameters of the generator connected therewith, and also includes means for electronically storing values and logic for operating the generator associated therewith, cooperatively with any other generator included in the generating station, via a similar controller associated with the other generator. The controller also includes means for computing from the monitored functions, actual operational parameters of the generator associated therewith, and includes means for transmitting signals representing selected ones of the actual operating status parameters and the monitored functions to the central computer. The controller further includes means for accepting signals representing generator control and adjustment requests from the central control station, generating generator control and adjustment signals therefrom, and controlling the generators as a group using these control and adjustment signals.

The controllers are configured and may be programmed such that, in any generating station including more than one generator, one of the controllers has a supervisory role in determining how the generators will operate cooperatively, and are also programmed and configured such that the supervising controller can automatically pass the supervisory role to another controller as a result of communicative arbitration.

The above-described configuration and arrangement of controllers provides that human intervention in the operation of a group of generators is unnecessary except in circumstances such as occurrence of unanticipated catastrophic events, actual physical replacement of parts or units of the generating station, periodic preventive maintenance, and replenishment of fuel or lubrication supplies. Controllers may be programmed to monitor or compute parameters such as generator efficiency (electrical energy output versus fuel consumed), engine coolant level and temperature, and engine exhaust temperature, one or more of which, if logged and monitored over a period of time and transmitted to the central control station, may provide advanced warning to the central control station of an impending component or unit failure. Given such a warning, maintenance personnel may be dispatched to the community in which the potentially malfunctioning generator is located to rectify whatever problem is responsible for the impending failure, hopefully, before it occurs.

The above described system provides that many corrective adjustments may be made to a generator via its associated controller by the above-discussed control and adjustment signals transmitted from the central control station. Preferably it is arranged that the central control station, by means of these signals, can override any controller function. By way of example these signals may provide that: any generator may be remotely enabled or disabled; any protective tripping devices that have been activated to automatically stop a generator if certain predetermined stored operating parameters are exceeded may be remotely reset; generator operating priority may be modified in response to a permanent change in load profile or to accommodate an extended temporary loss of use of one of the generators; and supervisory responsibility may be remotely transferred to any particular generator controller.

The controller includes signal processing circuitry for processing generator voltage signals before they are used by the controller for voltage regulation. The circuitry includes means for receiving a generally sinusoidal positive and negative going first analog signal representative an output voltage of the generator. The circuitry is arranged to convert the first analog signal into a second analog signal having only positive going cycles alternate ones of which are representative of the magnitude of alternate positive and negative cycles of said first analog signal. The circuitry is also arranged to convert the first analog signal into a square-wave pulse signal representative of polarity of the alternate half cycles of the first analog signal. The circuitry also includes means for receiving an anlog signal representative of residual neutral voltage of the generator and correcting the received analog generator voltage signal, before it is digitized, using this signal.

In a preferred voltage control method the controller repeatedly, at a fixed time interval, receives above discussed generator output voltage and residual neutral voltage signals, corrects said generator voltage signal according to said generator residual neutral signal, and provides a corrected generator output voltage signal to a the microcomputer for digitization and storage. Repeatedly, at a time interval synchronized to the generator frequency, the stored, digitized corrected, generator output voltage signal, is compared with a predetermined setpoint value and with a last previously sampled digitized corrected, generator output voltage signal. Based on this comparison a voltage error correction signal is generated and supplied to a voltage regulator, which is arranged to respond to the signal by generating a generator field current drive signal for regulating generator voltage.

As discussed above, the controller may be programmed to compute fuel efficiency of the generator. In one preferred fuel efficiency computing method, first and second current pulse signals representing respectively fuel flow to and fuel flow from the engine, are received by the controller. The current pulse signals have a frequency representative of volume fuel flow, and a magnitude representative of fuel temperature. The controller determines from the first and second current pulse signals, respectively first and second values of fuel volume flow and first and second values of fuel temperature. Using the first and second values of fuel volume flow, the first and second values of fuel temperature and from a predetermined standard temperature, the first and second fuel volume flows are standardized to the standard temperature. The standardized second fuel volume flow is subtracted from the first standardized fuel volume flow to determining a fuel consumption value. In response to a signal indicating that the generator has generated 1 KWH of electrical energy, the fuel consumption value is mathematically inverted, thereby providing a measure of fuel efficiency of electrical energy generation by the generator.

Fuel flow signals are processed in an electrical circuit, comprising means for receiving a train of current pulses from a fuel flow sensor monitoring the flow of fuel to or from the engine, the current pulses occur at a frequency proportional to volume flow of the fuel and have a magnitude representative of temperature of the fuel. The circuit includes means for converting the current pulses to analog voltage pulses, means for amplifying the analog voltage pulses; and means for delivering the amplified analog voltage pulses to an analog to digital conversion device in the microcmputer for digitization.

A system in accordance with the present invention is not limited to internal combustion engine driven generators for providing electrical power. A generating station may include generators of different kinds uniquely or in combination, for example, generators driven by hydraulic turbines or windmills. As each generator has its own associated controller, that controller may be programmed with appropriate operating powers of the particular generator while still being cooperative with the other controllers in maintaining a consistent set of electrical parameters for the generated electrical power. A combination of hydroelectric, wind and diesel generators may be advantageous in areas of heavy rainfall or high winds.

A system in accordance with the present invention is useful not only for supplying power to widely distributed communities in remote regions, but may provide a competitive alternative to a monopolistic centralized power distribution utility company in more populated areas. A utility company operating a system in accordance with the present invention may enter the electrical power market without the massive outlay required to build a centralized generating plant, which with its associated forest of distribution pylons may be an unwelcome neighbor. In a system in accordance with the present invention, capacity additions to the system need to be done incrementally in response to incremental increases in demand. This would usually prove advantageous for fiscal management of the system. Further, a local engine-driven generating station could be arranged to provide waste-heat from the driving engine for building heating purposes, and could also provide stand-by power for essential services in the event of a power outage in a larger utility system.

In a system in accordance with the present invention each of the generating stations may be defined as standalone generating stations, in that they are not connected in an electrical grid with other such stations outside of a community in which they are located. They may be independently, and locally owned, but centrally maintained and managed by a single entity which would provide operating and maintenance expertise as well as fuel, thereby affording a relatively small utility supplier or user the economies of scale of a large utility company. A generating station may be used only on an emergency or stand-by basis by a building or institution which is normally served by a utility company via a conventional power distribution network. Such a station could be remotely started and stopped by an operating company for test, evaluation, or adjustment to ensure that it is always in a state of readiness.

In yet another aspect of the present invention, a group of such stand-by generating units could be located and serve users in several buildings or institutions distributed throughout a metropolitan area which is usually served by a local grid section of conventional wide-area utility power grid. Each of the generators could be arranged to connect with the local grid such that, in the event power to the local grid were interrupted, the generating stations could be activated and connected to the grid, thereby providing back-up power not only for the buildings or institutions in which they were housed but to other users in the metropolitan area who either did not have a stand-by system or required temporary power until a stand-by system could be started. Means of making such grid connections would be well known to one familiar with the art to which the present invention pertains. Accordingly, further description of such grid connections is not presented herein.

The above-discussed advantages of a system in accordance with the present invention represent only a fraction of the potential advantages. From this summary description and a detailed description presented below, other advantages of a system for providing electrical power in accordance with the present invention will be evident to those familiar with the art to which the present invention pertains

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIGS. 12-15 are pseudo-code diagrams schematically representing software architecture for setting generator control modes for the microcomputer of FIG. 5.

FIG. 16 and FIG. 17 are pseudo-code diagrams schematically representing software architecture for error correction signal computation for voltage regulation in the computer of FIG. 5.

DETAILED DESCRIPTION OF THE INVENTION

Figure 1:
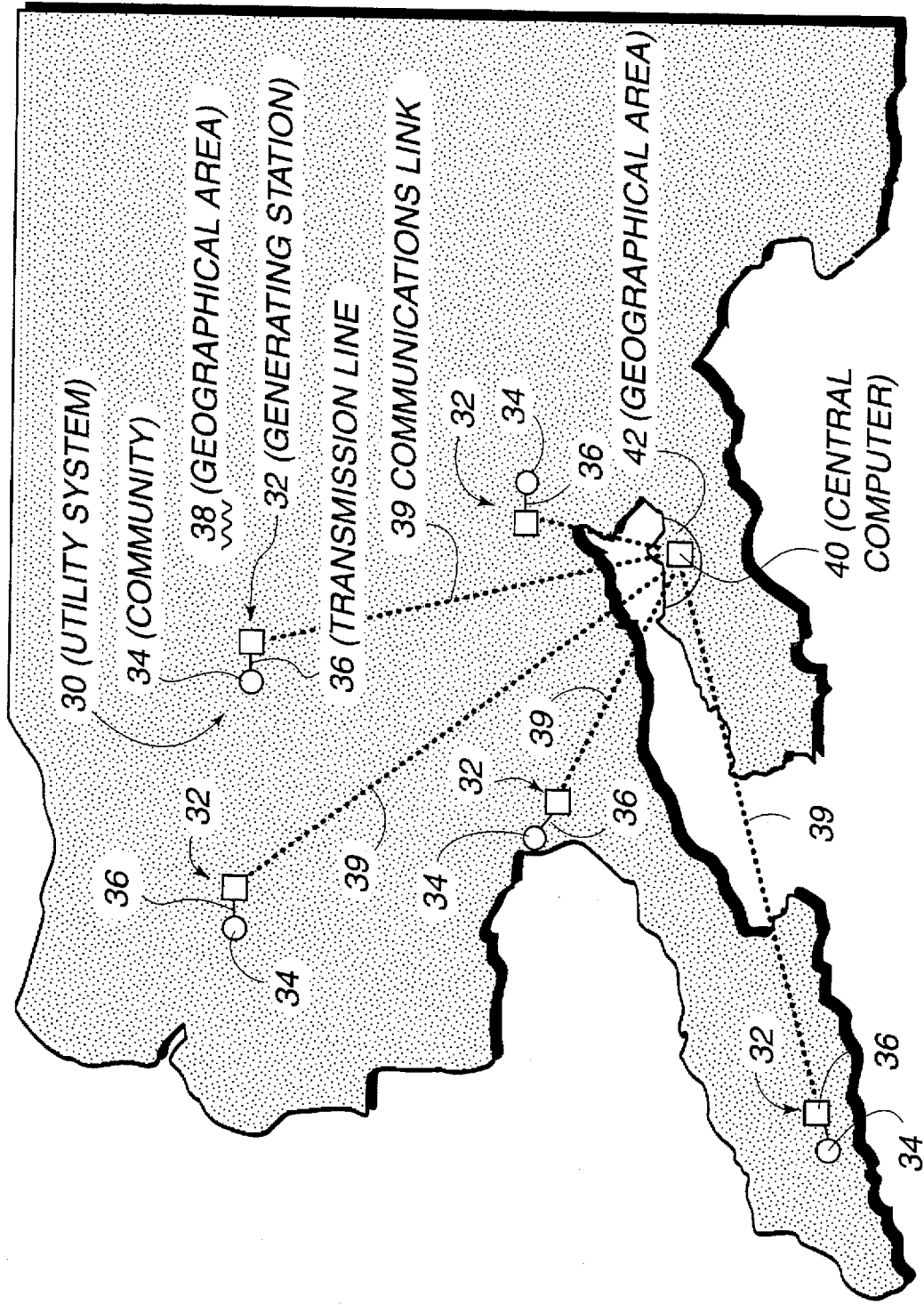
FIG. 1 is a cartographic view schematically illustrating a remotely controlled electrical power utility system in accordance with the present invention, including a plurality of generating stations distributed throughout a wide geographical area, each of the stations being in electronic communication with a central computer.

Turning now to the drawings, wherein like components are designated by like reference numerals, FIG. 1 illustrates a remotely managed utility system 30 in accordance with the present invention. System 30 includes a plurality of generating stations 32, each thereof including at least one electrical power generator (not shown). Each generating station 32 is situated proximate a community 34, which may include residential, commercial, and industrial users. Each generating station delivers electrical power to the community to which it is adjacent via a transmission line (or lines) 36.

Communities 34 are widely distributed over an extended geographical area 38, here, whimsically representing a south-western portion of the state of Alaska. Each generating station 32 is in electronic communication or is electronically linked (represented by broken lines 39) with a central computer 40 which is preferably located in a central management establishment in or close to a major metropolitan area 42 of region 38. It is pointed out here that the term "central" as applied to computer 40 indicates that the computer is central to the functionality of system 30. Clearly, it is not necessary that the computer be geographically centrally located, especially when communications are by satellite.

Electronic communication with central computer 40 may be accomplished by various means including, for example, hard-wired telephone line, wireless telephone connection, or satellite communications link, alone or in combination. A general requirement for communication link 39 is that it is capable of providing two-way, high-speed data transmission, preferably with few interruptions.

It should be noted here that each generating station 32 may be defined as a stand-alone generating station in that it supplies electricity only to the community 34 with which it is associated, and is not connected electrically, for load sharing purposes, with any other of the remotely located generating stations 32. The possibility that two or more generating stations adjacent to the same community could be electrically connected together in a local electrical grid for supply purposes is not precluded. The term community, as used herein, may describe a village, hamlet or town or a clustered group of small towns, villages, or hamlets, sufficiently close that electrical transmission from the generating station throughout the community can be effected without the type of high-voltage transmission lines used by centralized utilities for power transmission.

Figure 2:
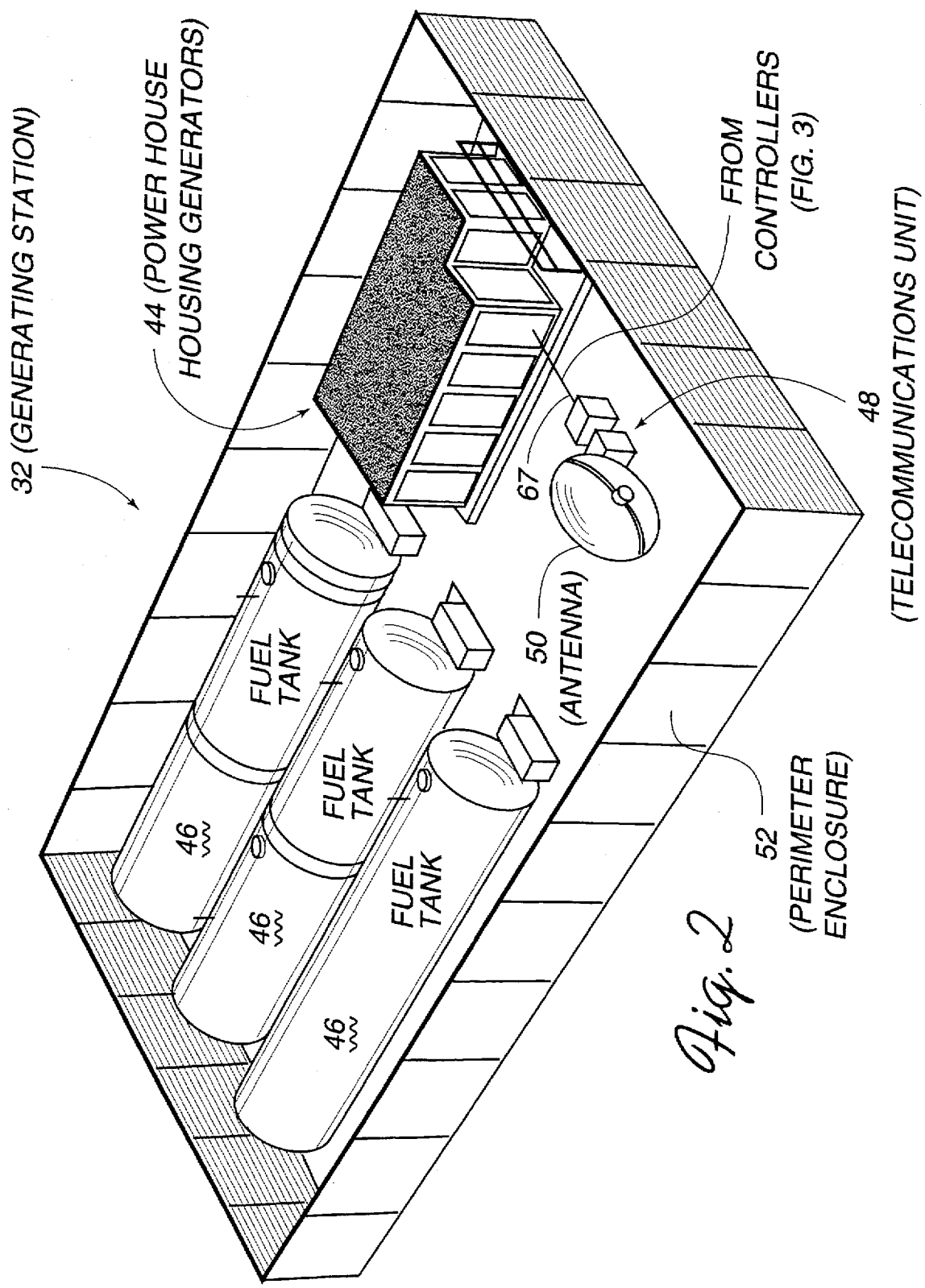
FIG. 2 is a perspective view schematically illustrating general layout of an electrical power generating station in accordance with the present invention, including a power house, fuel storage tanks and a telecommunications link for communicating with the central computer of FIG. 1

Referring now to FIG. 2, one preferred layout of a generating station 32 in accordance with the present invention is illustrated. Here, generating station 32 is arranged to have a total electrical power capacity of about two-hundred kilowatts (200 KW) and includes three diesel-engine-powered generators (not shown in FIG. 2) housed in a generator-house or power-house 44. Diesel-fuel tanks 46 preferably have a total fuel capacity of about sixty-thousand gallons of fuel, which is sufficient for between about two-hundred-fifty to four-hundred-fifty days of operation, depending on local demand. A telecommunications unit 48 including a dish-antenna 50 provides for communication, via a satellite link, with central computer 40. A perimeter enclosure 52 provides security for generating station 32.

Figure 3:
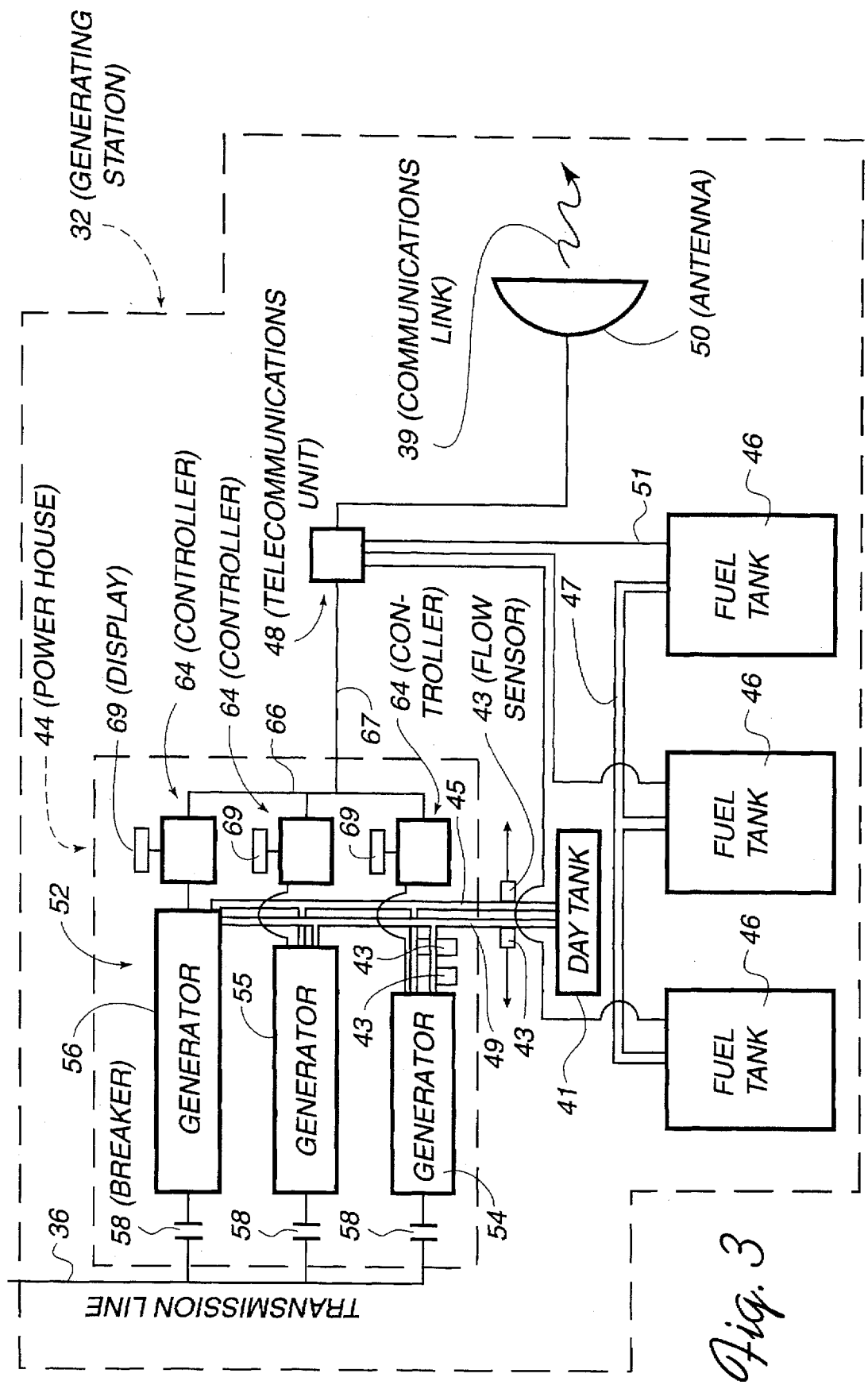
FIG. 3 is a block diagram schematically illustrating details of a group of three generators located in the powerhouse of FIG. 2, each of the generators including a generator controller in accordance with the present invention, the controllers for cooperatively and autonomously operating the generators.

Continuing now with reference to FIG. 3, details of a generator group 32, and control apparatus therefor, in generating station 32 are depicted. Here, generator group 52 includes three generators 54, 55, and 56. Preferably, but not necessarily, generators 54, 55, and 56 have different power output. Fuel is supplied to the generators, from fuel tanks 46, via a manifold 47, by means of a pump (not shown) to a day tank 41. From day tank 41, conduits 45 and 49 carry fuel respectively to and from the engines. In one preferred combination, generators 54, 55, and 56 have power output of about 60.0 KW, 100.0 KW, and 145.0 KW respectively.

Generators 54, 55, and 56 may be connected, singly or in combination, via breakers 58, to electrical transmission line or load 36. Usually, they are connected in a manner, dependent on the demand of the load, i.e., in a manner in which a generator or combination of generators supplies the load most efficiently. Clearly, however, providing more than one generator ensures that power may continue to be generated, albeit perhaps with less than optimum efficiency, in the event of a failure of one of the generators.

Associated with each of generators 56, 57, and 58 is a microcomputer based controller 64. Controllers 64 are preferably identically constructed. Each controller is configured and programmed to control the generator with which it is associated, to function as a supervisor of control and operation of generators 54, 55, and 56, cooperatively, as a group, and to communicate with central computer 40 via a communications line 67 and telecommunications unit 48. Each controller 64 is also programmed to communicate with the other controllers via a hard-wired communications link 66. Each controller preferably has a display 69 connected thereto for displaying performance parameters of the generator with which it is associated.

Each controller 64 is programmed such that, at any instant, one, and only one, of the controllers assumes the supervisory function, and the responsibility of communicating with central computer 40. Assumption of supervisory control and communication is determined by a mutual arbitration scheme which is described in detail hereinbelow.

Among functions of each controller 64 are well known functions of prior-art diesel engine driven generator controllers, such as voltage regulation and speed (frequency) control. In addition, each controller 64 is arranged to monitor engine, fuel supply, and generator parameters, and to compute from those parameters other parameters which, alone or in combination, will provide an indication of potential malfunction or failure of a generator or a component of a generating station, or simply of generator performance, for example fuel-efficiency.

It is well known that a generator becomes less efficient when load demand on the generator falls significantly below the generator's maximum power-output capability. A number of devices have been devised which are able to control a plurality of generators of different capacity, and to select which of these generators is connected to a load dependent on the magnitude of the load. This is done using predetermined assumptions of each generator's efficiency as a function of load. Switching from one generator to another is determined by the instant load on the system. Such devices will usually also shut down a generator, if certain preset conditions are exceeded, to protect the generator from potential catastrophic damage. While automatically shutting down a generator for this reason is clearly wise, were the community sufficiently remote, however, it may be several days before whatever problem triggered the shut-down could be rectified, and power restored to the community.

Each controller 64 is arranged to monitor and log parameters, progressive variations in which may be indicative of an impending malfunction, and to transmit these parameters and malfunction warnings to central computer 40 where they may be continually monitored. In this way, a potentially catastrophic malfunction can be anticipated. Skilled personnel can be dispatched to rectify conditions threatening the malfunction before it occurs, thereby ensuring that power generation continues uninterrupted. Each controller is programmed to log not only functions of the generator with which it associated but, as a supervisory controller, similar functions of the other generators.

A most important parameter to monitor and log in this regard is generator efficiency. Each controller 64 is arranged to actually monitor those parameters which determine the efficiency of the generator associated therewith and compute the efficiency of that generator based on the monitored parameters. Controller 64 has means to transmit the computed parameters and selected ones of the monitored parameters to central computer 40, where they can be evaluated and interpreted by skilled personnel. Before continuing with a further detailed description of controller 64, an example of how monitored and computed efficiency parameters can be used for prediction and control is set forth below.

In a diesel engine driven generator, power generation efficiency can be defined as electrical energy generated versus energy content of diesel fuel consumed. In controller 64, efficiency is determined by monitoring fuel flow to the generator, return fuel flow from the generator, and average power generated. Efficiency is computed by subtracting return fuel-flow from supply fuel-flow to obtain fuel consumption, and dividing the average power generated by the fuel consumption to determine generator efficiency. Periodic computation and logging of actual efficiency of the generator as a function of power generated, provides an indication of any downward trend in efficiency. A downward trend in efficiency is usually indicative of a progressive maladjustment or malfunction of the engine.

Flow meters 43 may be installed on each of generators 54, 55, and 56 (Shown only on generator 54 in FIG. 3). Alternatively fuel flow sensors may be installed only on main fuel supply conduit 45 and return conduit 49. Either way, by transmitting fuel flow measurements form sensors 43 to computer 50, the total fuel consumed by all generators in generating station 42 can be monitored. It is preferably arranged that instantaneous fuel capacity and temperature of tanks 46 can be requested from, and monitored by, computer 40 via communications link 39 and connections 51 between telecommunications unit 48 and the tanks, thus providing a measure of the rate at which the tanks are emptying. Comparing the rate at which tanks 46 are emptying with the rate at which fuel is consumed by generators 54, 55, and 56 can provide an indication that (if the fuel tanks empty faster than the generators consume fuel) there is a leak in the tank, or in any fuel manifolds or conduits between the tanks and the generators.

Figure 4:
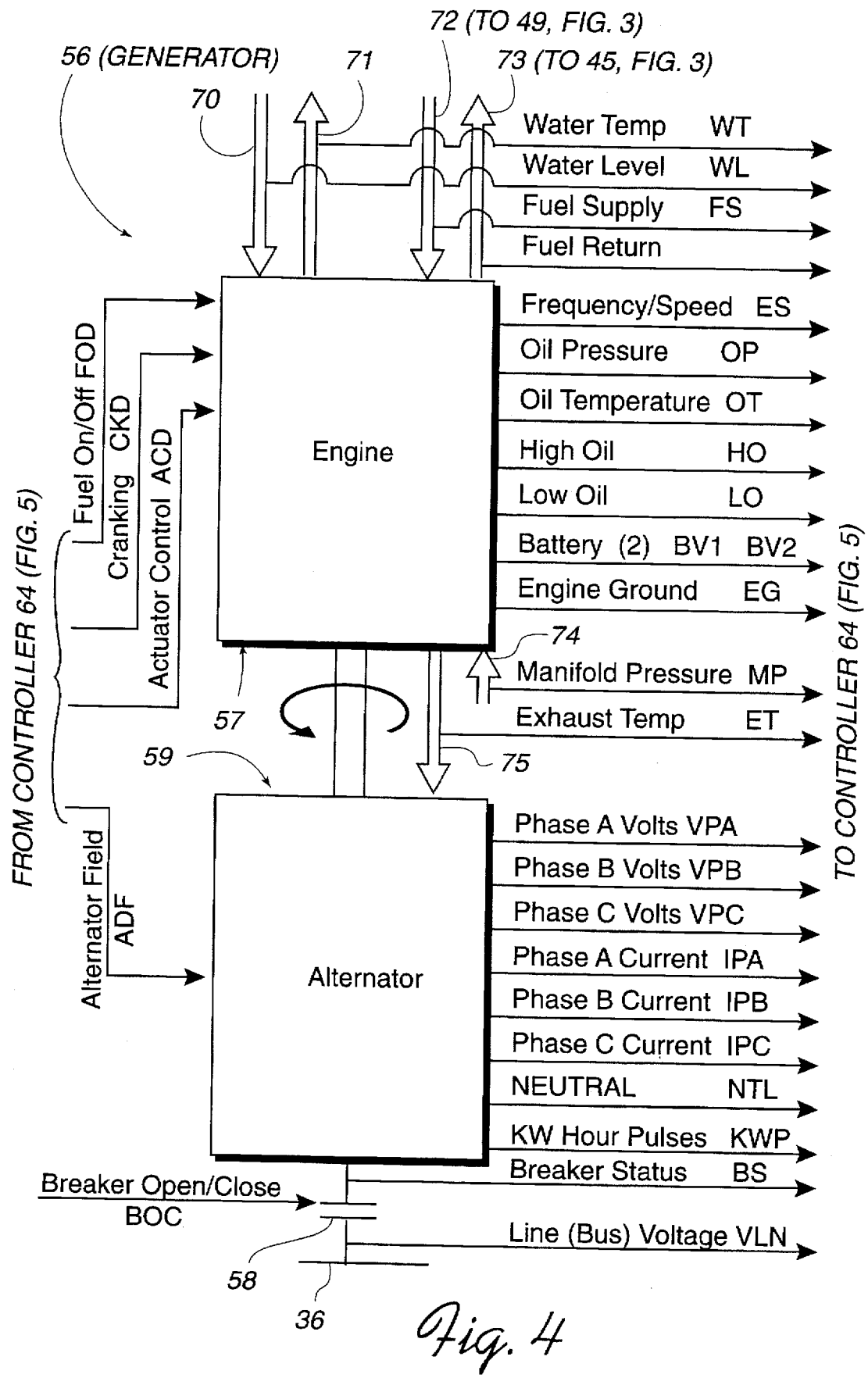
FIG. 4 is a block diagram schematically illustrating details of a generator in the generating station of FIG. 3, including an engine, an alternator, and connections between the alternator, the engine and a controller.

Referring now to FIG. 4, a description of signals representing one preferred set of monitoring and control parameters for a generator of FIG. 3 (here, generator 56) is presented. These signals are sent from the generator to controller 64 and received by the generator from controller 64. The generator comprises an engine 57 and an alternator 59. Engine 57 includes coolant (water) inlet and coolant outlet 70 and 71 respectively; fuel supply and fuel return lines 72 and 73 respectively; an air inlet 74, and an exhaust 75. Represented in FIG. 4, by arrows to or from the generator and alternator, are a preferred set of monitoring or control signals. The signals are designated by name and by a two or three letter code. The letter code is used for designating those signals in electronic circuit diagrams discussed hereinbelow to differentiate them from numerically designated physical components of the circuits. Sensors for generating the monitoring signals depicted are well known to those skilled in the art to which the present invention pertains. Accordingly, a detailed description and depiction of these sensors is not presented herein.

Signals which are for alarm and protective purposes only are: (coolant) water temperature (WT) and level (W); fuel supply (FS) and return (FR); oil pressure (OP) and oil temperature (OT); high oil (HO), which provides an indication when engine oil is overfilled, and low oil (LO); battery (two lines BV1 and BV2); engine ground (EG) which provides a measure of the ground potential of those sensors which are attached to the engine; manifold pressure (MP) which gives an indication of the condition of a turbo charger (not shown) which is a part of engine 57; and exhaust temperature.

Signals to the engine used for control purposes include fuel on/off (FOD) which is may be used to stop engine 57, and cranking (CKD) which turns on and off a starter motor (not shown) for starting engine 57. An actuator control signal (ACD) regulates the speed of the engine via a governor (not shown) and thus the frequency of voltage generated by alternator 59. These signals are provided by controller 64 of FIG. 3.

Monitoring signals from alternator 59 include voltage of all three phases (VPA, VPB, and VPC); current from all three phases (IPA, IPB, and IPC); and a neutral signal (NTL). Signal NTL provides a measure of any residual voltage to ground, which is usually minimal, and is used for correcting voltage signals in controller 64. As each kilowatt hour (KWH) is generated by alternator 69, a KWH pulse is initiates a generator efficiency (KWH per gallon) computation, by the controller, using a fuel consumption value computed from signals FS and FR. The KWH pulse may be sent to controller 64 from alternator 69 or internally generated by controller 64.

Breaker status signal BS is used to inform controller 64 whether generator 56 is connected to or disconnected from load 36 by breaker 58. If a manual breaker were used and a separate contactor device (not shown) were used to connect and disconnect generator 56, signal BS would be provided by an auxiliary switch (not shown) mounted on the manual breaker. A line voltage signal VLN is common to all generators in generator group 52.

Control signals to alternator 59 include a breaker open/close signal (BOC) which is used by controller 64 to connect or disconnect generator 56 to or from load 36, and an alternator field signal which is used to regulate alternator field current and thus output voltage of alternator 59.

Figure 5:
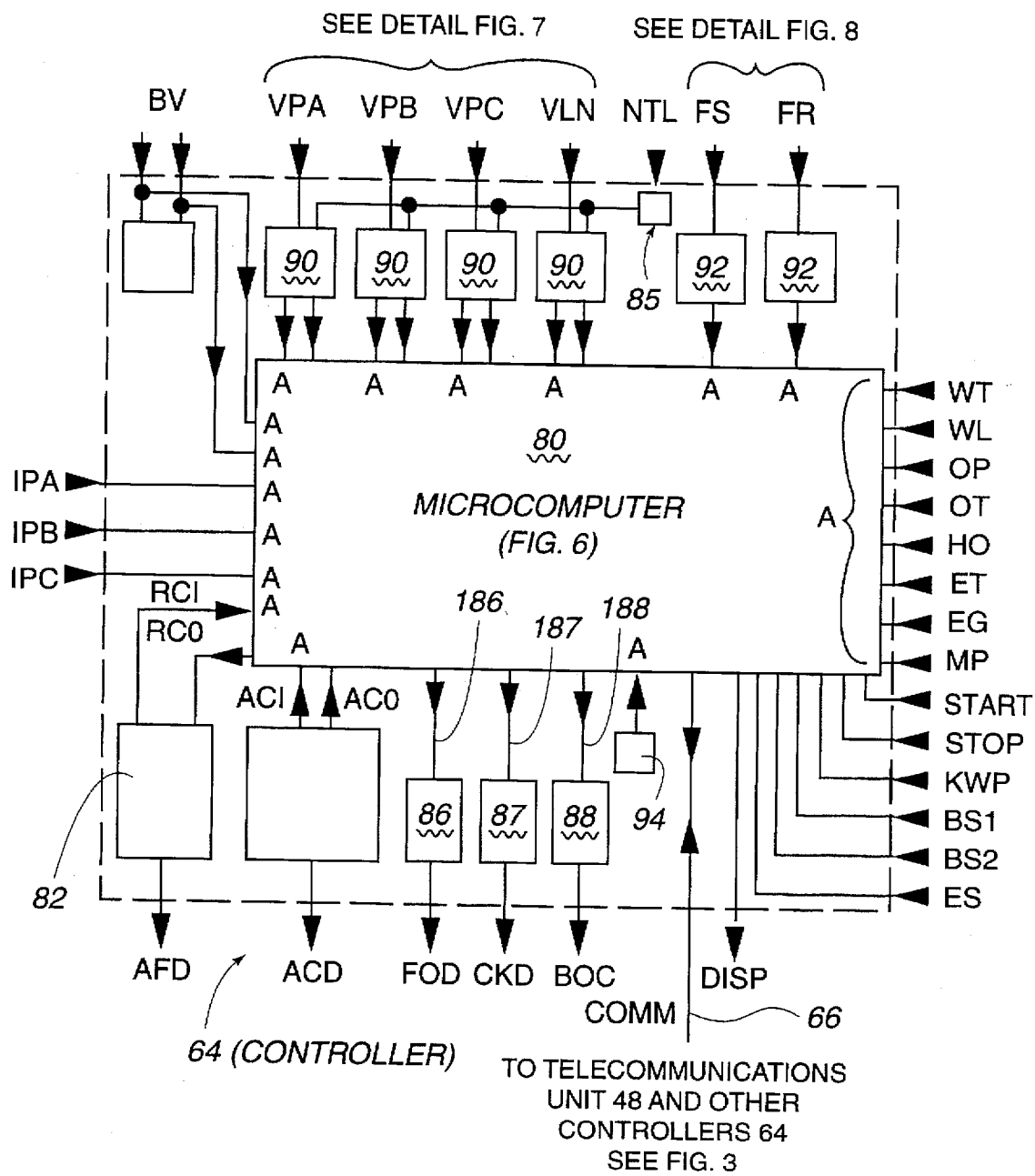
FIG. 5 is a block diagram schematically illustrating arrangement of a microcomputer, control-circuits and components and connections therebetween in the controller of FIG. 4.

Referring now to FIG. 5, a description of important components of controller 64 and their interconnection is provided. Controller 64 is powered via a power supply circuit 83 by a twelve-volt (12 V) or 24.0 V battery (not shown) associated with generator 56. Connections between the power supply and components of controller 64 have been omitted for clarity. Controller 64 includes a microcomputer 80, which is discussed in detail hereinbelow, a voltage regulator 82, preferably operating on a pulse width modulation principle, a governor controller 84, and relays 86 (fuel solenoid relay), 87 (crank drive relay), and 88 (breaker open/close relay) which provide respectively signals FOD, CKD, and BOC for controlling engine 57 and for connecting and disconnecting generator 56 to and from load 36 (see FIG. 3).

As voltage regulators and governors are described extensively throughout the prior art to which the present invention pertains, a detailed description of the circuitry of such components is not presented herein. As described herein voltage regulator 82 and governor controller 84 are of relatively simple form and are arranged simply to provide an adjusting signal in response to a received error correcting signal representative of an error to be corrected.

It is pointed out here, however, that the manner in which voltage regulator 82 and governor controller 84 are operated by microcomputer 80, and the manner in which data and signals for operating these components are conditioned and processed by microcomputer 80 and other components of controller 64 to provide such error correcting signals is believed to be a novel and important aspect of controller 64. Such operation is described in detail hereinbelow.

In this regard, controller 64 includes novel circuits 90 which are used to process A/C analog voltage signals VPA, VPB, VPC, and VLN before they are presented to computer. Each circuit 90 receives an input analog voltage signal for example VPA, representing that phase voltage to be processed, and, via a neutral signal processing circuit 85, the NTL signal representing residual neutral voltage to be compensated for. Circuit 90 corrects the VPA signal according to the NTL signal, and then divides the corrected signal into an analog portion representing instantaneous magnitude, and a binary portion representing instantaneous polarity. The analog and binary portions are delivered separately to microcomputer 80. The analog portion is digitized by microcomputer 80 by an internal analog to digital converter, and stored for later use.

It is believed that the above-described analog voltage signal processing step, provides for more accurate generator voltage control by microcomputer 80 and voltage regulator 82 with minimal complexity, whatever the type of voltage regulator used, and whatever the operating procedure used by microcomputer 80 for operating the voltage controller. A detailed description of a preferred circuit arrangement for signal processing circuits 90 is presented hereinbelow.

Continuing now with reference to FIG. 5, controller 64 includes circuits 92 for processing fuel-flow monitoring signals FS and FR. These fuel flow signals are preferably provided by a magnetic, rotary-vane flow-meter for example a Model 235, manufactured by the Flowscan Instrument Company of Seattle, Wash. which provides a train of current pulses, the frequency of which is representative of the fuel flow rate. The magnitude of the current pulses is temperature dependent. A particularly important aspect of the present invention is the precise determination of fuel flow for providing similarly precise computations of generator efficiency.

In this regard, each of circuits 92 is arranged to convert the incoming current-pulse signal (FS or FR) into an analog voltage pulse signal. The voltage pulse signal is digitized and used by microcomputer 80 to determine the actual volume flow of fuel standardized to a predetermined ambient temperature. This eliminates variability due to periodic temperature changes, which is a particular problem in regions of extreme climate, or a difference in temperature of supply and return fuel. This fuel signal processing aspect of the present invention provides for more accurate determination of efficiency trends in a generator performance. A detailed description of preferred circuitry for circuits 92 and a method of computer processing output signals from the circuits is presented hereinbelow.

Controller 64 includes a temperature sensor 94 which provides an analog signal to microcomputer 80 representative of temperature in a housing (not shown) enclosing controller 64. This temperature signal is considered important in controller 64 and is used for two purposes. One purpose is simply to provide an indication of possible extreme temperature of controller 64 which may interfere with its proper functioning. The signal is also used by microcomputer 80 for correcting monitored engine related temperature signals WT, OT and ET which are preferably provided by bi-metal thermocouples. Such thermocouples are preferred because they are consistent, and reliable at high temperatures, for example, exhaust temperatures. However, thermocouples are relative rather than absolute devices, insofar as they measure the temperature difference between a warm bimetal junction at a measuring point, and a cooler one, connected in a circuit. By locating the cooler junction right at the controller 64 i.e., making the cool bimetal connection at the controller, the internal temperature will be almost at the same temperature as this cool junction, and can be added on to the thermocouple reading to obtain absolute temperature readings at the hot (sensing) junction.

Before proceeding with a description of the layout and functions of microcomputer 80, it should be noted that microcomputer 80 receives both analog and binary (two-level, high-low or pulse) signals. In FIG. 5, all analog signals delivered to microcomputer 80 are designated by the letter "A". These signals require conversion to digital form before they are can be stored or processed. Any input not so designated is of a binary form.

Figure 6:
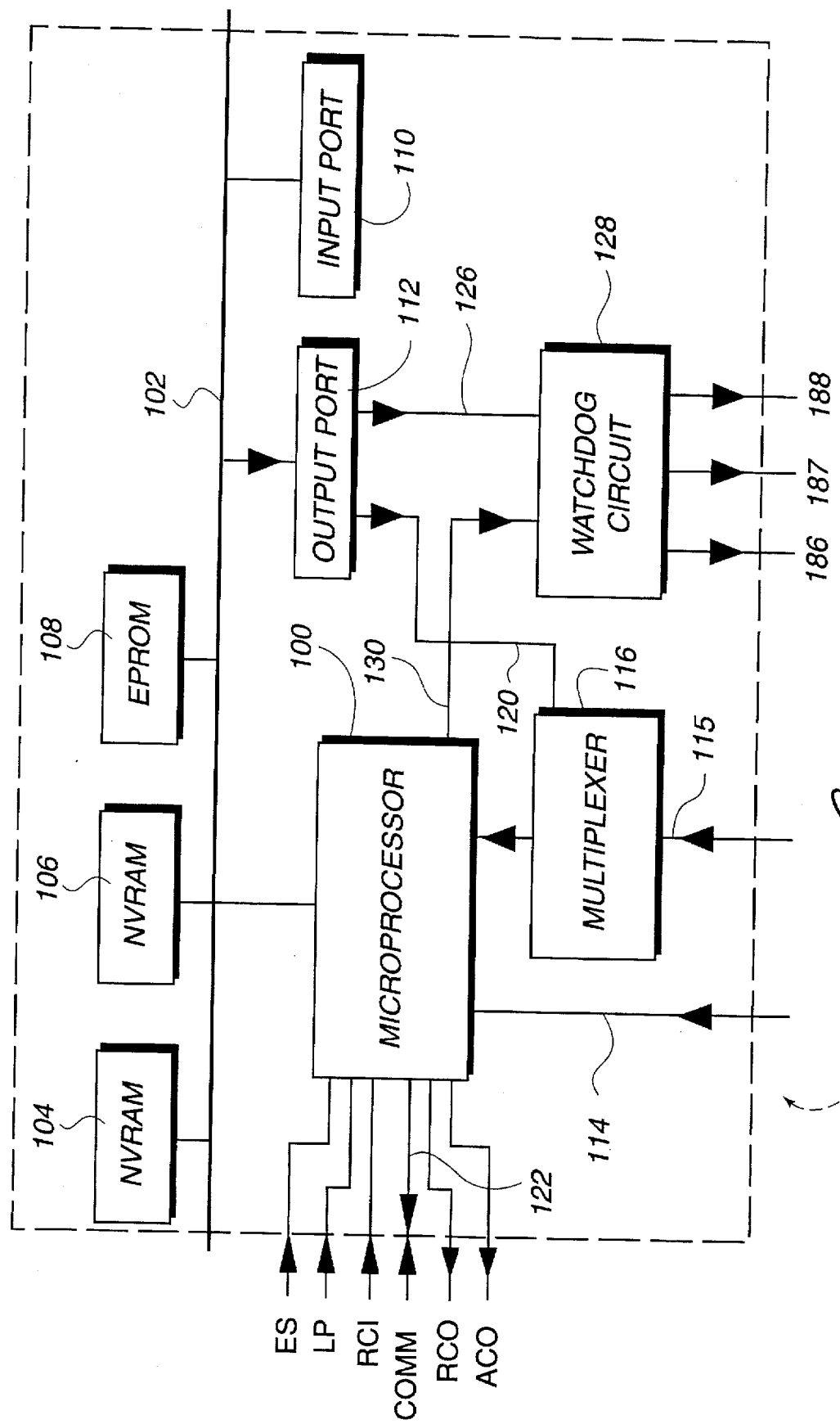
FIG. 6 is a block diagram schematically illustrating arrangement and interconnection of components of the microcomputer of FIG. 5.

Referring now to FIG. 6, microcomputer 80 is preferably based on a type 80C196KC microcomputer (processor) 100 produced by the Intel Corporation of Santa Clara, Calif. Processor 100 communicates, via a 16-bit wide data bus 102 with a clock/calendar non-volatile, random-access memory (NVRAM) 104; a main NVRAM 106; an erasable, programmable, read-only memory (EPROM) 108; and input and output ports 110 and 112 respectively.

Clock/calendar NVRAM 104 provides time and date data for data logging functions which are an important aspect of the present invention. Main NVRAM 106 is used to store all control and set point values necessary for operation of generators 54, 55, and 56, and signal processing and correcting operations. It is also used to store and log selected monitored or computed operating parameters of the generator which it is operating, and parameters of any generators the operation of which it is supervising. For a system of three generators, as described herein, a memory size of about 128 Kilobytes (128 KB) can store about twelve monitored or computer parameters over a period of about twenty days. Logging and storage is arranged on a circular basis, such that if data is not received in time, the oldest data will be overwritten with the newest data.

EPROM 108 stores primarily program instructions for operating microcomputer 80. Microcomputer 80 is self reprogrammable in that it is able to erase the existing program in EPROM 108 and load a new program into the EPROM whenever controller 64 is not actually running a generator. This self reprogramming may be performed in response to a command and new programming instructions transmitted to controller 64 from central computer 40, according to a procedure described hereinbelow.

Leads carrying certain digital or binary signals are connected directly to processor 100. These are: engine speed ES; a signal (LP) representing line voltage polarity (see FIG. 5); and a signal RCI (see FIG. 5) representing voltage regulator (field) current. All other binary input signals shown in FIG. 5 are communicated to processor 100 via input port 110 and data bus 102.

Continuing with reference to FIG. 6, processor 100 processes instructions and data according to a priority scheme which is described in detail hereinbelow. Those analog signals which have the highest processing priority are digitized, and communicated directly to processor 100 (which has an internal anlog to digital converter), as represented, collectively, by line 114. These signals include the magnitudes of VPA, VPB, VPC, and VLN. All other analog signals are digitized and communicated to a multiplexer 116 as represented collectively by line 115. Multiplexer 116 includes a system of buffers and logic for controlling signal flow to processor 100 in accordance with the priority scheme. Switching and buffering operations of multiplexer 116 are controlled by signals from processor 100. The signals are communicated to the multiplexer via data bus 102 output port 112, and a connection 120 between the output port and the multiplexer.

As analog-to-digital and digital-to-analog conversion devices are well known to those skilled in the art to which the present invention pertains, placement of such devices will be evident to such skilled persons from the written description of important elements of FIG. 6. Accordingly, a representation of such devices has been omitted from FIG. 6 for clarity. Similarly, buffering and multiplexing logic arrangements are also well known to those skilled in the art to which the present invention pertains. Accordingly a detailed description of a circuit arrangement for multiplexer 116 is not presented herein. Suitable circuit arrangements for multiplexer 116 will be evident to such skilled persons from a detailed description of a preferred signal processing priority scheme presented hereinbelow.

A connection 122 via communications lines 66 and 67 (see FIG. 3) provides for two-way communications directly between processor 100, like processors in the other controllers 64 of generator group 52, and telecommunications unit 48. Control signals RCO and ACO for controlling voltage regulator 82 and governor controller 84 (see FIG. 5) are transmitted directly thereto from processor 100.

Control signals for operating relays 86, 87 and 88 are transmitted from processor 100, via data bus 102, output port 112 attached thereto, and a three-line connection represented by line 126, to a "watchdog" circuit 128. Watchdog circuit is controlled by signals transmitted thereto from processor 100 via line 130 and simply provides that the relays will not energize unless the controller is operating in a normal acceptable fashion. Lines 186, 187, and 188 connect the watchdog circuit to the corresponding relays.

As discussed above, voltage control accuracy is considered very important in a controller in accordance with the present invention. Accordingly, specific circuitry has been included in controller 64 which contributes, together with other aspects of the controller, to providing such accuracy. In controller 64, generator phase-voltage signal processing circuits 90 address two specific problems. One of these problems is the generally recognized difficulty of accurately digitizing a positive and negative going AC signal in a conventional ADC device. The other problem is inaccuracies in measured voltage due to variations between the neutral line and ground.

Figure 7:
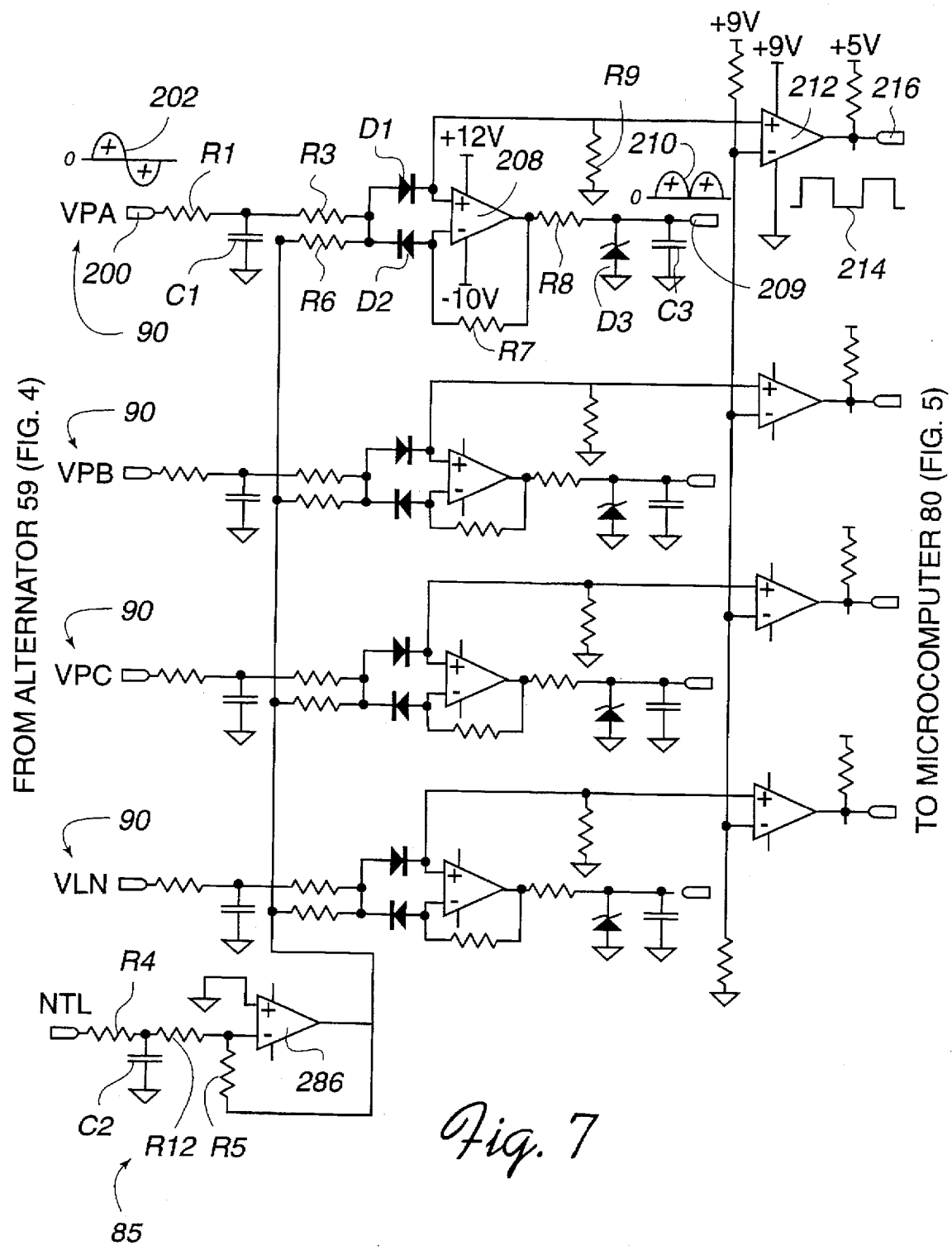
FIG. 7 is a circuit diagram schematically illustrating interconnection of components of generator-voltage signal processing circuits in the controller of FIG. 4.

FIG. 7 depicts circuitry which provides VPA, VPB, VPC, and VLN signal processing circuits 90 depicted schematically in the form of interconnect blocks in FIG. 5. Circuits 90 are identical. Accordingly, the description presented below for an upper one of the circuits (for signal VPA) suffices for the remaining three circuits. All four circuits are depicted, however, for the purpose of illustrating the manner in which neutral signal (NTL) correction is applied to the circuits.

The VPA signal is applied to an input pin 200 of circuit 90, the input VPA signal having a positive and negative going, generally sinusoidal form as illustrated by symbol 202. Resistor R1 preferably having resistance of about two Megohms (2 MΩ) converts the voltage signal into a current signal. Capacitor C1 and resistor R3 provide two paths for this current. In one path, high frequency noise is diverted away from the circuit by capacitor C1. Capacitor C1 has a value of about two-hundred-seventy picofarads (270 pF). In another path, the lowest frequency of interest is supplied to the circuit via resistor R3 which has a value of four-hundred-seventy Kilohms (470 KΩ).

Neutral voltage signal NTL input at pin 204 is converted to a current signal by resistor R4, which preferably has a value of about 2 MΩ. The converted signal is then inverted and restored to a voltage signal by an operational amplifier 206 and a resistor R5 preferably having a value of about 261 KΩ. Comparator 206 is preferably a type TL084 amplifier manufactured by Texas Instruments Inc. Components R4, R12, R5, C2, and comparator 206 constitute neutral signal processing circuit 85 of FIG. 5.

Diodes D1 and D2, amplifier 208 and resistors R7 and R9 form a current-mode precision full-wave rectifier. Resistors R7 and R9 preferably have values of 20 KΩ and 22 KΩ respectively, and amplifier 208 is preferably a type TL084 amplifier. The voltage output of comparator 206, representative of NTL inverted, is converted back into a current signal by R6 and added to the current converted VPA signal at the input to the rectifier. The result, which is VPA-NTL, is then rectified and the resultant signal is delivered to output pin 209 in the form indicated by symbol 210, which has only positive going cycles. Alternate ones of these cycles represent the magnitude of successive positive and negative going cycles of the original VPA-VNL signal.

The positive input side of a comparator 212 is connected to the positive input side of amplifier 208 thereby detecting only positive going cycles input to amplifier 208. Comparator 212 is preferably a type LM339 manufactured by National Semiconductor Inc. A small voltage of about 50 millivolts (mV) is applied to the negative side of comparator 212. This small voltage ensures that a zero input on the positive input to comparator 212, as during negative going signal cycles, will produce the correct low output from comparator 212. A square-wave pulse signal indicated by symbol 214 is delivered to output pin 216. This signal is used by microcomputer 80 to identify the polarity of the alternate cycles of signal 210.

The following resistor values or ratios are important to the proper functioning of circuit 90. The input circuitry of R1, C1, and R3 must match the NTL circuitry of R4, C2, and R12, and the values of R5 and R6 must match. This ensures that the NTL and VPA currents supplied to diodes D1 and D2 are in similar ratios. R7 should be equal to the calculated resistance of R6 and R9 in parallel to obtain symmetry of the positive and negative cycles on the output of amplifier 208.

Figure 8:
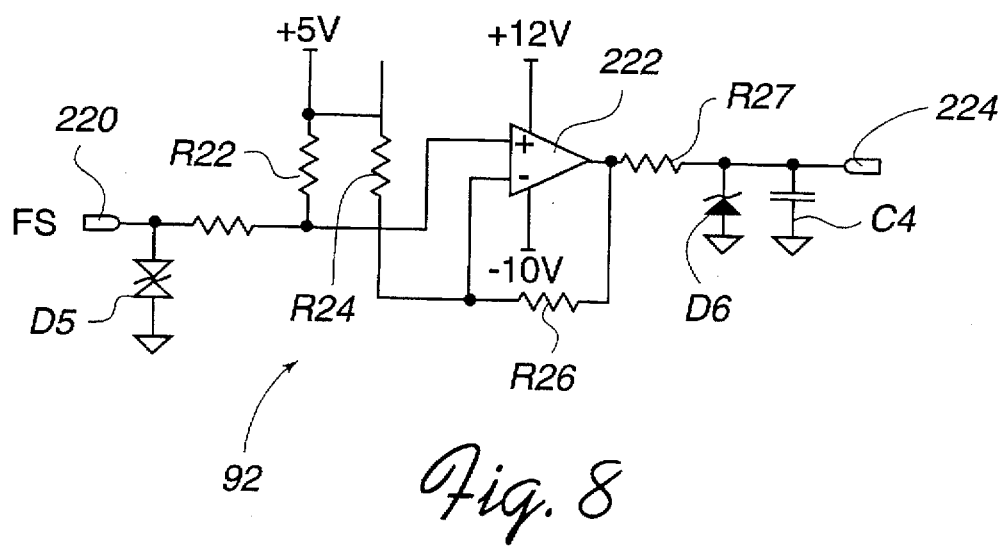
FIG. 8 is a circuit diagram schematically illustrating interconnection of components of a fuel-flow meter current-pulse processing circuit in the controller of FIG. 4.

Turning now to FIG. 8, components and interconnections of a fuel-flow signal processing circuit 92 are illustrated. Circuit 92 is designed to convert current pulses draining to ground at FS into voltage pulses suitable for analog-digital-conversion. A fuel flow signal, here FS, is input into circuit 92 via input pin 220. During the "on" portion of the FS pulse, current flowing to FS is supplied across R22, which has a value of 1 KΩ. This causes voltage drop to a level below the 5 V supply voltage. The drop below 5 V is amplified by amplifier 222, preferably of type TL084, by a voltage ratio equal to 5.91 that is set by resistors R26, (having a value of 49 KΩ) and R24 (having a value of 10 KΩ). When the FS input pulse is "off", all voltages at the inputs and output of amplifier 222 change to the 5 volt level. These two voltage levels are delivered as a string of voltage pulses via output pin 224 to microcomputer 44. The maximum value at pin 224 is close to 5 V, and the minimum value is about 3 to 4 volts.

A preferred method for processing these signals, and for using the processed signals to determine generator efficiency is set forth below with reference to FIG. 9, wherein the method is depicted schematically in flow chart form in flow chart form.

Figure 9A:
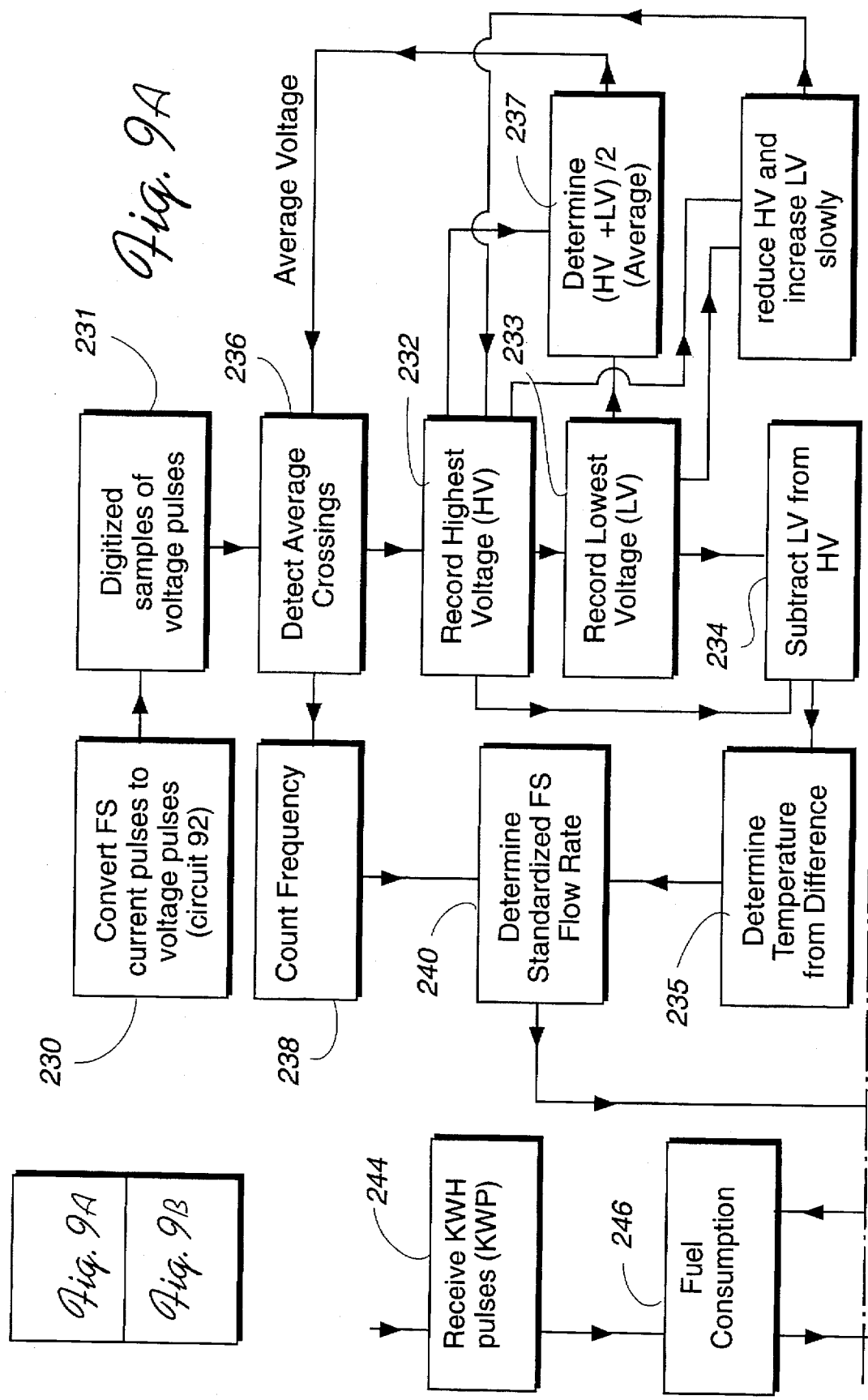
FIG. 9 is a flow chart schematically illustrating a method of computing a temperature-standardized volume fuel-flow rate from digitized processed signals from the circuit of FIG. 8.
Figure 9B:
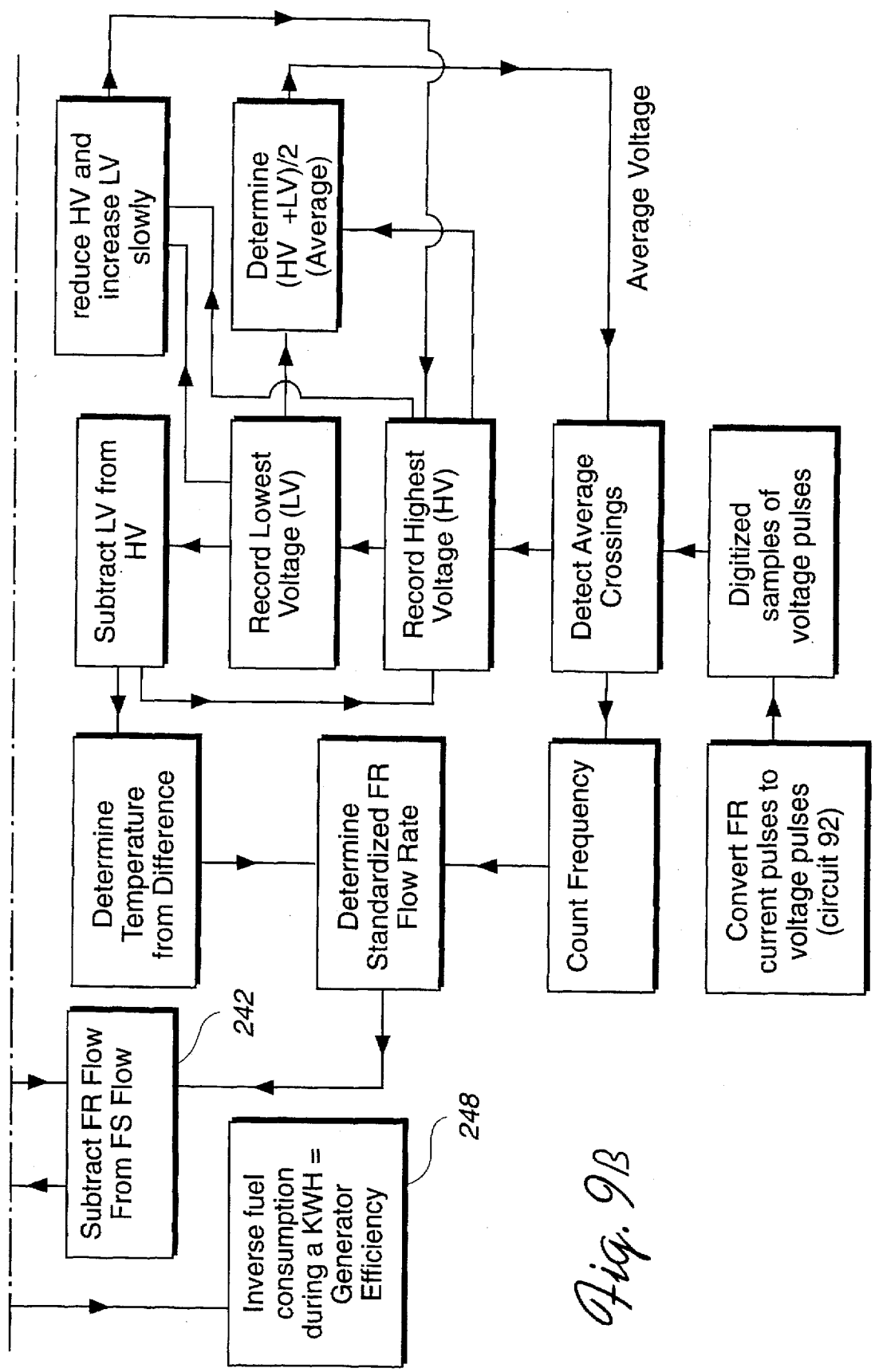

FIG. 9 shows that fuel supply FS and fuel return FR are separately calculated and temperature compensated to a standard temperature, i.e., to a specific density at the standard temperature, and the results subtracted to obtain fuel flow. The fuel flow is in turn processed, using above-described KWH pulse information, to provide a measure of efficiency of generator 56. This calculation and compensation is described here in terms of fuel supply signal FS.

There are three asynchronous elements of the efficiency calculation process. These are: a sampling of FS and FR signals which is done on a fixed time interval basis; a pulse frequency and magnitude calculation which is synchronized to the pulse frequency; and an efficiency calculation which is synchronized to KWH production by the generator.

Voltage pulses output from circuit 92 after conversion from current pulses (box 230) have a frequency between about thirty Hertz (30 Hz) and 300 Hz and a form which may be described as an asymmetric square form. The pulses are digitized for processing by microcomputer 80 (box 231). Microcomputer 80 is programmed to sample the digitized signals at intervals of about one millisecond, and to determine, from the sampling, the highest value HV of voltage (box 232) and the lowest value LV of voltage (box 233) input from circuit 92. The millisecond sampling rate is sufficiently fast that the HV and LV values accurately represent the peak and trough of a pulse.

The lowest value LV is subtracted from the highest value HV (box 234) and the difference is multiplied by a stored calibration factor to determine fuel temperature (box 235). An average or mid-point value ((HV+LV)/2) is computed (box 237) and compared with incoming pulses in box 236 to determine when the input voltage from circuit 92 has crossed the computed mid-point. Mid-point crossings are counted (box 238), and the count frequency is to determine a flow velocity. The flow velocity and temperature are then used to determine the standardized fuel flow (box 240). The standardized fuel return flow is subtracted from the standardized fuel supply flow to determine fuel consumption (box 242).

After every temperature determination (box 234), the recorded value of HV is incrementally decreased and the recorded value of LV is incrementally increased by an amount that will track slow decreases in HV or slow increases in LV. If this were not done the maximum HV and minimum LV recorded would be held indefinitely, in which case no further temperature changes would ever be tracked. An incremental increase and decease rate that will reset HV and LV over an interval from twenty seconds to a few minutes is preferred.

On receipt of a KWP pulse representing generation of a KWH increment (box 244), the amount of fuel consumed since the last KWP pulse was received is calculated (box 246). The inverse of the fuel consumed provides a measure of generator efficiency in terms of Kilowatt Hours per gallon (KWH/gal).

It is pointed out here that while all controllers can execute the above described procedure and compute efficiency of individual generators, in a preferred embodiment of the present invention there is only one efficiency monitoring point per generator group. This is in the interest of economy (fuel flow sensors are expensive) and reducing programming complexity. The efficiency computation task is assigned to one controller 64 only, and is performed by that controller even if the generator it is controlling is not on-line or operating.

The above presented detailed description of a multiple generator control and management system in accordance with the present invention, is directed primarily to hardware aspects of the invention. Set forth below is a description of programming aspects of microcomputer 80 for carrying out the control and monitoring tasks of the present invention.

Programming for microcomputer 80 consists of a series of routines or code blocks which are carried out asynchronously, according to a predetermined priority scheme which can be varied only by reprogramming microcomputer 80. The priority scheme groups control, monitoring, logging and communication routines into four priority levels. Certain of the routines will be familiar to those skilled in the art to which the present invention pertains and are be described hereinbelow briefly or mentioned only by title. Those which are considered particularly important are described in detail with supporting illustration where appropriate.

The highest or fourth priority level includes eight routines. Each of the routines in this level, once initiated, are carried to completion, without interruption for any reason. These routines are: communications transmitting a byte; communications receiving a byte; initializing execution of a new program remotely loaded; governor actuator drive and current sampling; field drive timing for the voltage regulator; generator voltage zero crossing detection; and line frequency zero crossing detection.

The next (third) priority level is directed to power and efficiency calculation and includes code for sampling all voltages and currents; calculating fuel flow and fuel consumption using the above discussed temperature compensation scheme; and, from this sampling and calculation, calculating power, reactive power, and the difference between line and generator voltages.

This third-level sampling is performed about 1000 times per second but the sampling interval is not a fixed interval. The actual interval is a predetermined fraction, preferably one-forty-eighth, of a frequency cycle, and is phase and frequency locked to the alternator output frequency by monitoring frequency and timing of VPA polarity transitions.

The second level routines are interuptable and are directed primarily to generator control functions. Second level routines include checks against stored test or preset values for protective trips and alarms. Several timed controlled functions are executed in this level. This is simplified by consistently spaced execution. The routines include checks for: high and low alternator voltage and frequency; high internal temperature of controller 64; low oil level and pressure; high oil level; high water temperature; high exhaust temperature; failure to maintain minimum power; loss of synchronization while running; failure to start; and a remote request for a trip (shut down). A battery voltage check is made only for an alarm level.

Also executed at the second priority are routines for generator control; governor (frequency) control; and voltage regulator control. A detailed description of these routines is presented hereinafter.

At the first or lowest level are performed background routines which are not time-critical. These include: analysis of data packages received from either central computer 40 or from a controller 64 which may has assumed a supervisory function; organization of data packages for transmission; read-in of non-time critical analog variables, such as; management of reprogrammability; calculation of generator (fuel) efficiency; and all data retrieval and logging.

Before presenting a description of any of the above discussed generator control routines in detail, it is important to describe supervisory functions of a controller 64 and the scheme by which a controller 64 assumes a supervisory role. As discussed above, an important aspect of the present invention is that one, and only one, of controllers in a generator group assumes supervisory control of cooperative operation of the generator group at any instant. Each controller being preferably identically constructed and containing an identical program, the supervisory role can be assumed by a controller of any generator that is currently connected to load 36. Only the supervisory controller can send and receive communications to central controller 40.

A supervisory controller, at intervals of about one minute, sends out a command to all other controllers to set control modes of those controllers and voltage and frequency setpoint values for voltage and frequency control. The other controllers reply to the command by transmitting to the supervisory controller their current operating mode, and the alarm and trip status, power and reactive power and average voltage of the generator with which they are associated.

Initial assumption of the supervisory role is done by a random selection process. In one preferred such process, after initial power up, each controller waits for a period of time greater than sixty seconds but not less than one-hundred-twenty-five seconds before assuming the supervisory function. Each controller 64 is provided with a unique serial number from 1 to 65535. This number is stored in microcomputer 80. The waiting time is calculated by microcomputer 80 adding sixty seconds to the controller's serial number expressed in milliseconds. Hence, immediately after an initial system start-up with all controllers energized together, and no controller having yet a supervisory role, that role will usually be assumed by the controller having the lowest serial number. This scheme also provides that two controllers will not usually attempt to assume control simultaneously.

Immediately after assuming a supervisory role, the supervisory controller 64 broadcasts the above discussed command which may be defined as a "who's there" message over communications line 66 to all other controllers 64. On receipt of the "who's there" message, the other controllers will reset the control assuming routine, operate their programs in the monitoring mode only, and report their operating parameters and status to the supervisory controller as discussed above. Subsequently, supervisory commands will be sent at least every minute. If no supervisory command is heard by a controller 64 for a minute plus its serial number times milliseconds, then that controller will attempt to take over supervisory responsibilities. In this manner, supervisory control is re-established even if the supervising controller is incapacitated without warning. The other controllers will respond with data packages after waiting a time period based on their serial number. One preferred method is to compute the modulus of the serial number divided by 2000 and use the result expressed in milliseconds as the waiting period.

The supervisory controller will retain the supervisory role until the generator which it is controlling is taken off line or shut down, either by the controller or by a request received from central computer 40. Once a controller 64 has assumed supervisory control, that controller assumes the responsibility for starting and stopping generators under a variety of circumstances; distributing load demand optimally among available generators; responding to alarm and trip messages generated by any of the controllers, including itself, time-keeping, fine frequency adjustments, fine voltage adjustments, and communicating via telecommunications link 39 with central computer 40.

Figure 10B:
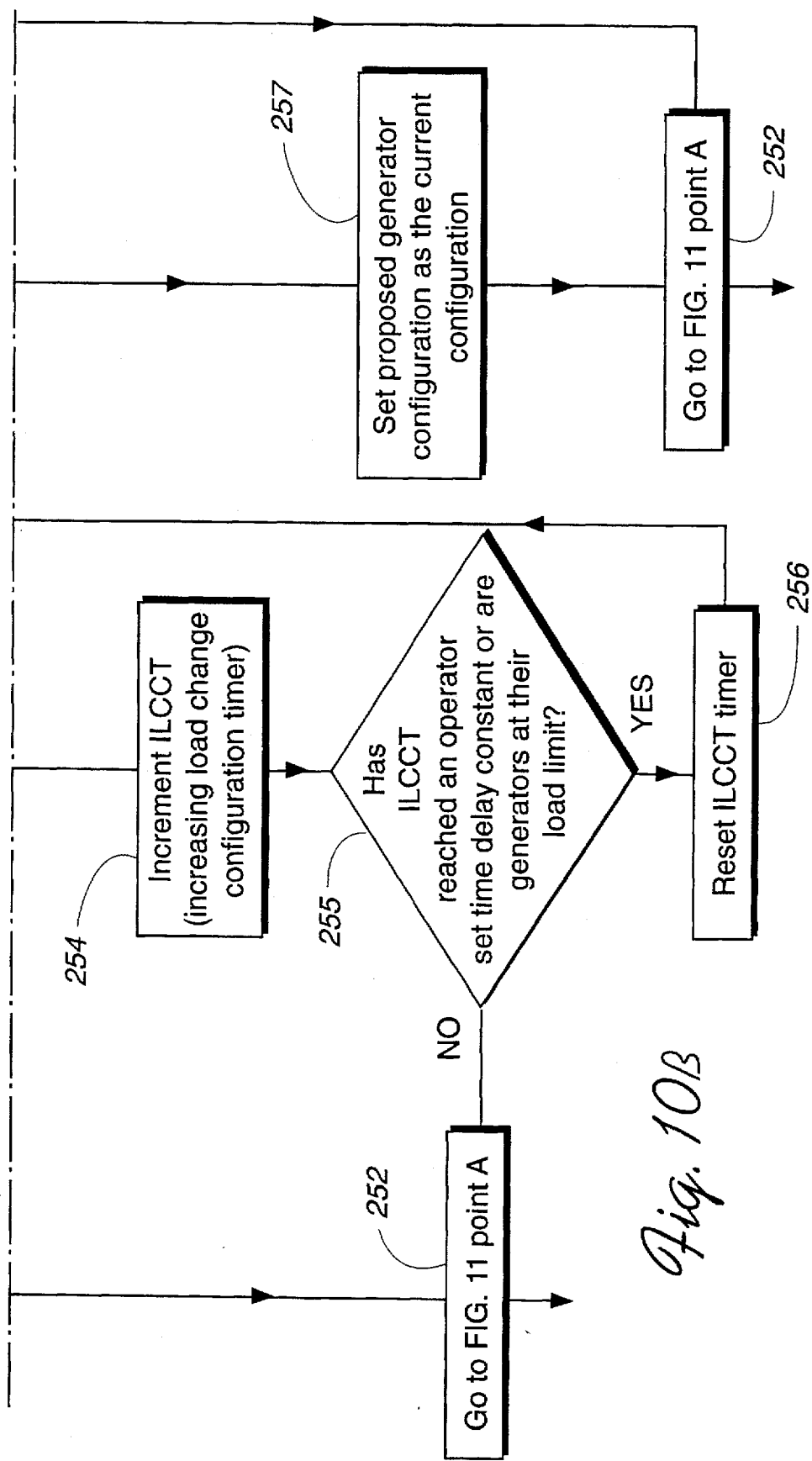
FIG. 10 and FIG. 11 are flow charts schematically illustrating supervisory functions and decisions of a supervisory one of the generator controllers of FIG. 3.
Figure 11B:
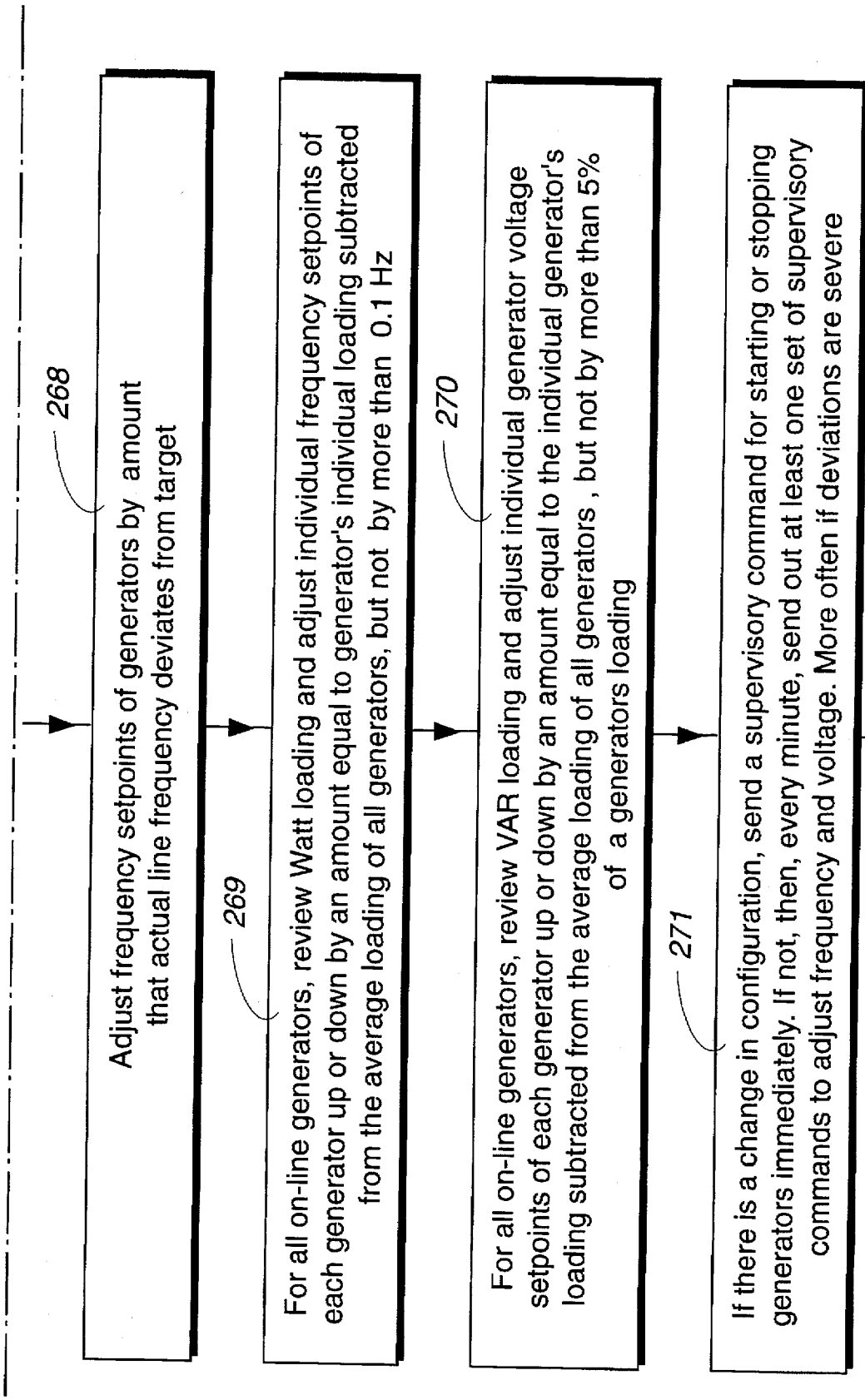

Regarding starting and stopping functions, and configuring generators for load distribution in response to instant demand, an illustration of certain of these functions is provided in a decision tree or flow-chart form in FIG. 10 and FIG. 11. Flow charts depicted in FIGS. 10 and 11 represent a program cycle of microcomputer 80 which occurs constantly, approximately ten times per second, to determine if a currently operating generator configuration should be changed, i.e., generators either removed or added to optimally accommodate an increasing or decreasing load, and implements such a change.

A target configuration is referred to in FIGS. 10 and 11. This target configuration is a configuration which provides an operator determined compromise between efficiency of generation and generator stops and also provides some margin to accommodate some load increase without a configuration change being required. FIG. 10 depicts a first program section which determines whether a change of target configuration is necessary. FIG. 11 depicts a second (operational) program section (starting at point A) which implements a configuration change if necessary.

Referring to FIG. 10, a check is made (box 250) to determine if any generators currently on-line are operating above a preprogrammed maximum, continuous-running output. Generators which have a trip pending are regarded as having zero capacity. If the answer is yes, the program next checks to determine if all generators are above their programmed maximum output or if any have a trip pending (box 251). If the answer is no, the program proceeds to the beginning of the operational section (box 252). If the answer is yes, the program next determines (box 253) the smallest capacity configuration of available generators capable of providing the current load plus an operator determined constant based on above-discussed target configuration compromise criteria. Generators which are out of service, tripped or have pending trips are counted as having zero capacity for purposes of this determination. The program next increments an increasing load change configuration timer (ILCCT) variable (box 254). Next, the program determines if the incremented ILCCT has reached an operator preset delay time, or if any the generators have reached a load limit. If the answer is no, the program proceeds to the operational section (box 252). If the answer is yes the ILCCT timer variable is reset (box 256) and the program proceeds (box 257) to set the configuration determined (proposed) in box 253 as the current (new) target configuration (box 254), and then proceeds to the operational section (box 252).

The foregoing description has been concerned with how a supervisory controller 64 decides how to respond to increasing load. Continuing with reference to FIG. 10, the following description describes how a supervisory controller 64 decides how to respond to decreasing load.

Returning to box 250, if it is determined that no generators are operating above their preprogrammed maximum output, the program proceeds to determine (box 258) if there is an available generator configuration which is lower in maximum capacity than the current configuration but is still greater than the current load requirement. If the answer is no, the program proceeds (box 259) to reset an decreasing-load, configuration-change-threshold accumulator variable (DLCCT), the purpose of which is discussed below, and then proceeds (box 252) to the operational section.

If (box 258) it is determined that a different generator configuration is available, the program proceeds to calculate (box 260) a current fractional capacity difference between the proposed configuration capacity and the current load and accumulates this in the above discussed variable DLCCT. The program next determines (box 261) if the accumulated DLCCT is greater than an operator determined constant (based on above-discussed target configuration compromise criteria). If the answer is no, the program proceeds to the operational section (box 252). If the answer is yes the program proceeds (box 257) to set the proposed generator configuration as a (new) current target configuration.

Referring now to FIG. 11 the above discussed operational program section is described. This section of program is responsible for implementing a configuration change if one has been proposed in the previous section.

The program first decides (box 262) if all generators required by the target configuration are on-line or in the process of coming on line. If the answer is no, the program initiates (box 263) a start sequence for generators which have not already started or are not on-line. If the answer is yes the program proceeds to determine (box 264) if there are any generators on-line which are not required by the target configuration. If the answer is yes a stop sequence for all such generators is initiated (box 265).

Whether or not any start or stop sequences have been initiated, the program proceeds to adjust target setpoint voltage of generators by the amount the actual line voltage varies from an exact nominal value (box 266). Next (box 267) the program adjusts the target line frequency by an amount up to but not greater than 0.1 Hz off of a nominal 60 Hz value. This is based on an accumulated "time-keeping" error which is based on the difference between one time period determined by counting actual frequency cycles as being exactly one sixtieth of a second and another time period determined over the counting period by internal clock (Q) of microcomputer 80. It is arranged that a ten second error in time will generate the maximum 0.1 Hz deviation. Larger errors do not cause larger deviations but are stored for eventual correction. The frequency setpoints of on-line generators are then adjusted (box 268) by an amount that actual line frequency deviates from setpoint frequency.

Next, (box 269) for all on-line generators, the program reviews the Watt loading of individual generators and adjusts the frequency setpoints of those generators up or down by an amount equal to the averaged loading of all generators and the corresponding individual generator's loading. Loading, in this case, refers to a loading determined as a percentage of the generators' maximum continuous-running capacity. This frequency setpoint adjustment is restricted to adjust individual setpoints by no more than 0.1 Hz, as loading will normally share equally between generators provided their frequency setpoints are essentially identical.

The program next reviews (box 270), for all on-line generators, the VAR loading of individual generators and adjusts the voltage setpoints of those generators up or down by an amount equal to the averaged (percentage of maximum) loading of all generators and the corresponding individual generator's (percentage of maximum) loading. This voltage setpoint adjustment is restricted to adjust individual setpoints by no more than 5 percent, as VAR loading will normally share equally between generators provided their voltage setpoints are essentially identical.

Finally (box 271) if a configuration change has been initiated the appropriate supervisory start or stop commands are sent immediately to generators affected by the change. Also whether or not there has been a configuration change the program sends every minute at least one set of voltage and frequency adjustment commands. This may be done at more frequent intervals if deviations in voltage and frequency are severe.

It should be noted here that a supervisory controller, 64 in addition to reconfiguring and starting and stopping generators automatically, as discussed above, will do so in response to a remote or local signal or command received along communications line 66. The local signal is typically generated by a manual start or stop button (not shown). The remote signal would usually be transmitted from central computer 40.

To ensure that voltage regulators of on-line generators do not fight unnecessarily for control of a generator configuration system voltage, individual voltage regulators are arranged to permit generator voltage to drift up or down slightly in response to reactive power flow. As the line voltage changes as a result of this action, controller 64 adjusts the voltage regulators of all other on-line generators to compensate (boxes 272 and 274). Similarly, to ensure that governors of on-line generators do not fight unnecessarily for control of a generator configuration system frequency, individual governors regulators are arranged to permit generator frequency to drift up or down slightly in response to KW flow. If the line frequency changes, controller 64 adjusts the governors of all other on-line generators to compensate (boxes 276 and 278).

The switching, starting, and stopping operations described above provide that load is balanced among running generators as a percentage of generator output capability and will be executed by controller 64, except in the following circumstances. When two or more generators are running and one is to be arbitrarily shut down, for example, for inspection, the supervisory controller 64 will transfer that generator's load to the other generator or generators. When a generator has just been connected to load 36, the supervisory controller will gradually increase that generators load to match the other generators.

Finally, but not exhaustively, when an engine provides an alarm warning as a result of a monitored parameter reaching a preset alarm level, controller 64 will start one or more other generators and transfer the alarm-providing generator's load to those generators. The controller will communicate the alarm and the cause of the alarm with central computer 40, and will lock-out the alarm-providing generator from further operation unless it is required to provide power continuity. If a generator has been tripped, controller 64 will report the time and cause of the trip to central controller 40, and will lock that generator out of further operations until the cause of the trip has been rectified.

Figure 12:
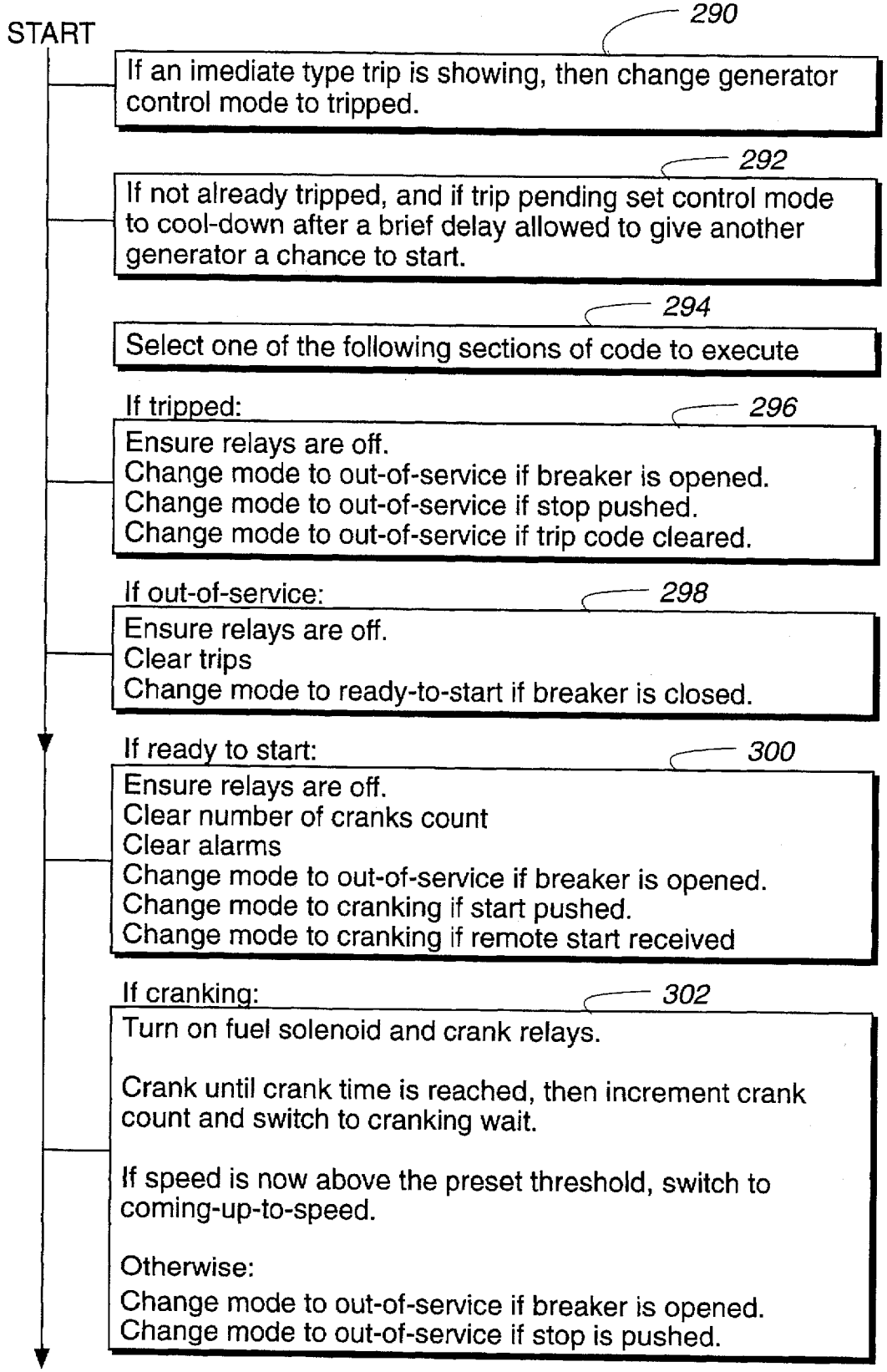

Continuing now to with reference to FIG. 12, generator control operations of a supervisory controller 64 are next described. Generator control code is executed by microcomputer 80 of controller 64 every 10 milliseconds. Each generator is controlled by the code according to one of eleven modes or code sequences of operation. These modes are: tripped; out-of-service; ready-to-start; cranking, i.e., attempting to start; cranking wait, i.e., when a generator start has been attempted, has failed after a preset crank count, and is waiting to crank again; coming-up to speed, i.e., when a generator has been successfully started and is being brought into a condition to connect to load 36; stand-alone running i.e., when a generator is running at a nominal speed not yet synchronized or connected to load 36; synchronizing, i.e., when generator voltage polarity and phase are being synchronized with load polarity and phase; on-line; unloading, i.e., when a generator is transferring its load prior to shut down; and cool-down.

If an immediate type trip is indicated, the appropriate generators control mode is set to "tripped" (box 290). If the generator is not already tripped, but a trip is signalled as pending, the controller will set the generators control mode to "cool-down" after a brief preset delay, the delay being required to give another generator a chance to start (box 292).

Every ten milliseconds the supervisory controller will select one of the following sections of coded instructions to execute (box 294). If the control mode is "tripped" (box 296), the controller ensures that relays 86, 87, and 88 (see FIG. 5) are off; and, if either the associated breaker 58 (see FIG. 3) is open, a manual stop command has been received, or a trip code has been cleared, the control mode will be set to "out-of service".

In the "out-of-service mode" (box 298), the controller ensures that relays 86, 87, and 88 are off, clears trip codes; and, if the associated breaker 58 is closed, changes the control mode to "ready-to-start". In the "ready to start mode" (box 300), the controller ensures that relays 86, 87, and 88 are off, initializes (clears) a number of cranks count to zero, and clears all alarm codes. If the associated breaker 58 is opened, the control mode is changed to "out-of service". If either a local or remote start signal is received, the control mode is set to "cranking".

In the "cranking" control mode (box 302), the controller turns on fuel solenoid and crank relays 86 and 87. Engine 57 (see FIG. 4) is then cranked until the engine starts and reaches a preset threshold speed, or a preset crank time elapses, whichever occurs first. If the preset crank time elapses, then crank count is incremented (indicating that one start has been attempted) and the control mode is set to "cranking wait". If engine 57 starts, and the speed exceeds the preset threshold, the control mode is switched to "coming-up-to-speed". Otherwise, the control mode is set to "out-of-service" if either breaker 58 is opened, or a stop signal is received.

Continuing now with reference to FIG. 13, in the "cranking wait" mode (box 304), microcomputer 80 turns on only fuel solenoid relay 86. After a preset inter-crank time has elapsed, the crank count is compared to a preset maximum permissible number of cranks. If the crank count is equal to the maximum number of cranks, the control mode returns to "tripped", as engine 57 has failed to start after this maximum permissible number of cranks. If the maximum number of cranks has not been reached, the control mode is returned to "cranking". If the engine starts and the preset speed threshold is exceeded, control shifts to the "coming-up-to-speed" mode. Otherwise, the control mode is switched to "out-of-service" if either breaker 58 is opened, or a remote or local stop signal is received.

In the "coming-up-to-speed" mode (box 306), microcomputer 80 turns on only fuel solenoid relay 86. If a preset nominal (not yet synchronized) running speed is reached, control is switched to the "stand-alone running" mode. Otherwise, the control mode is switched to "out-of-service" if either breaker 58 is opened, or a remote or local stop signal is received.

In the "stand-alone running" mode (box 308), microcomputer 80 turns on only fuel solenoid relay 86. If a "syncing only" flag is received, indicating that the generator voltage polarity and frequency are to be synchronized with the line or load voltage and frequency prior to connecting the generator to the load, then control mode is immediately changed to "synchronizing". Otherwise, the control mode is switched to "cool-down" if either breaker 58 is opened, or a local stop signal is received; switched to "synchronizing" if allowed and a local start or remote signal is received; or switched to "cool-down" if synchronizing is allowed, and this mode is run longer than a preset maximum time.

Continuing with reference to FIG. 14, in the "synchronizing" mode (box 310) microcomputer 80 turns on only fuel solenoid relay 86. If the computer operates in this mode for longer than a preset maximum allowed time, the control mode is set to tripped on failure to synchronize. If line 36 is "dead", and connection to a dead line is allowed, control is switched to the "on-line" mode after a preset delay.

If the instantaneous voltage difference between the output of alternator 59 and line 36 (line 36 is "live") is less than a preset threshold, then a slip count is incremented. If it is greater than the preset threshold, the slip count is reset.

When the slip count is above a preset threshold, the relative frequency difference of alternator 59 and line 36 is guaranteed low enough for synchronization. This is one of three required criteria for synchronizing. If the instantaneous difference in voltage magnitude between the alternator output and the line is below the preset threshold, the second of the three required criteria for synchronizing is met. If the phase angle between the alternator waveform and the line waveform is less than a preset maximum, then the relative phase is sufficiently close for synchronization. This is the third and last requirement for synchronization.

If all three required criteria are met, control mode is switched to "on-line". Otherwise the control mode is switched to "cool-down" if either breaker 58 is opened, (disconnecting the generator from the line), or a remote or local stop signal is received In the "on-line" mode (box 312), microcomputer 80 turns on fuel solenoid relay 86 and breaker open/close relay 88. Control mode is switched to "cool-down" if either breaker 58 is opened, or synchronization is lost for some external reason. Control mode is switched to "unloading" if a remote or local stop signal is received.

In the "unloading" mode (box 314), microcomputer 80 turns on fuel solenoid relay 86 and breaker open/close relay 88. One minute maximum is allowed for load to transfer to another generator, then control is switched to the "cool-down" mode. Control mode is also switched to "cool-down" if a remote or local stop signal is received. Control mode is switched back to "on-line" if a remote or local start signal is received.

Figure 15:

Referring now to FIG. 15, in the "cool-down" mode (box 316), microcomputer 80 turns on only fuel solenoid relay 86. After a preset time in the cool-down mode has elapsed, control is switched to the "ready" mode. Otherwise, the control mode is switched to "coming-up-to-speed" if a local or remote start signal is received.

As discussed above, several types of microcomputer controlled voltage regulator circuits have been described in the prior art and may be useful in a controller 64 in accordance with the present invention. The voltage regulation scheme of controller 64, however, differs from prior art voltage regulation schemes in the manner in which voltage signals are sampled and processed for increased accuracy, and also in the scheme by which a voltage control signal is generated from those sampled values. This scheme or code routine is discussed below with reference to FIGS. 16 and 17.

The routine incorporates error signal integration steps which allow small errors to be detected and compensated for, while limiting inaccuracy due to noise. The routine also provides that the voltage regulator does not attempt to correct a detected error in one step, but corrects the error gradually or fractionally, i.e., corrects less than the entire error in each step. This is effective in essentially eliminating overcorrection and the consequent possibility of oscillation of generator voltage about a preset value.

It should be noted here that for computation purposes nominal generator voltage is arbitrarily set at a value 36,000 by multipying whatever the nominal voltage really is by an appropriate value. This provides that even the smallest errors detected may be treated as integer values for computation purposes.

Referring first to FIG. 16, the change in alternator voltage since the last time the routine was executed, a short time previously, is calculated and stored for later use as a "differential term" (box 320). For a voltage change of 1% per second this term will have a value of plus or minus twenty-four (±24), depending on whether volatage is increasing or decreasing. Depending on the current mode of operation of controller 64, one of five sections of code is executed (box 322). These code sections are executed for determining a control or set point voltage to which voltage will be controlled. In the "shut-down" mode, there is no voltage regulation and the voltage set point is zero. In the "starting" mode, which is active during cranking and acceleration to speed, the voltage setpoint is set at seventy-five percent of its eventual value. In an "at-speed" mode, voltage setpoint is quickly and smoothly increased to one hundred-percent of the "normally operating" setpoint value. This allows for fine corrections. In the "synchronizing" mode, the voltage set point is adjusted to match the voltage of line 36. In the "on-line" mode, the voltage set point is set its "normally operating" value, plus any fine adjustment which may be made from supervisory control and plus any adjustment required for reactive power loading, used to prevent regulator conflict over line voltage. Once the setpoint has been determined in accordance with the operating mode of controller 64, the following instructions are executed in the sequence described.

If the frequency of alternator 59 falls below a set threshold value, voltage starts to decrease in proportion to further reductions in frequency (box 324). This action protects electro-magnetic power devices such as transformers that may be connected to the power system. Changes to the voltage setpoint are limited to ten percent per second to avoid sudden alternator voltage changes. The actual alternator voltage is subtracted from the setpoint to obtain the voltage error (box 326), the voltage error, which will be positive when the actual voltage is too low and negative when too high, is then processed (boxes 328-346) by a what might be termed a proportional, integral, differential control algorithm (PID).

PID algorithm constants referred to in the following explanation are chosen by calculation and experiment to maximize the performance of the voltage regulator. Note that the differential term value has already been calculated as discussed above.

First the error is limited to a preset maximum positive or negative error if necessary (box 330). The voltage error is then added to an existing number that represents accumulated error and is referred to as an "integral term" (box 332). The integral term is limited to a preset maximum positive or negative value, preferably ±20,000, if necessary (box 334). This limitation is usally not applied during normal running, but may be necessary when large voltage errors are present, for example, during a period when a generator is being brought up to speed prior to being connected on-line. The voltage error is multiplied by a preset constant, preferably about 0.3, and the result stored as a "proportional term" (box 336).

Continuing now with reference to FIG. 16, the previously calculated differential term is also multiplied by a preset constant (box 338). A preferred value for this constant is about 0.6. The differential term is next added to the proportional term, the result being designated as a "running value" (box 340). The running value deviates either positive or negative with the amount of deviation proportional to the error in voltage. Since small deviations are more acceptable than larger ones, if the running value is less in magnitude than a preset value (PSRV1) in either the positive or negative direction, the running value is reduced by fifty percent (box 342). If the running value magnitude is more than PSRV1, it is reduced by a fixed value equal to 50% of PSRV1. If the resultant running value is less in magnitude than preset value PSRV2, the running value is reduced by fifty percent (box 342). If the running value magnitude is more than preset value PSRV2, it is reduced by a fixed value equal to 50% of the preset value PSRV2. Fixed reduction values are preferably set at 0.25 of gain (or loss) if it is less than about ±1% and at about 0.5 percent of voltage gain or loss if it is less than about ±0.3%. The action of these two thresholds is to provide smooth transitions in control, without discontinuities, with less response when the error is low, and greater response when the error is greater. Finally, without altering the integral term value itself, the integral term value is multiplied by a preset constant multiplier and the result is added to the last calculated running value (box 344). The running value is now the signal RCO made available to voltage regulator 82 (see FIG. 5), the higher the running value, the higher the signal AFD delivered to alternator 59, and the higher the alternator field current.

The above described routine for computing voltage correction signal RCO and hence AFD is executed once for every cycle of power, for example, every one-sixtieth of a second at nominal 60 Hz frequency. Generator voltages sampled by the above-described routine are those voltages which have been processed by circuits 90 of FIG. 4 and computed and stored by microcomputer 80. These voltages are also sampled at a periodically calculated interval of exactly 48 times during every cycle of power, i.e., about one millisecond for 60 Hz nominal frequency. Voltage regulator 82 uses the running value or RCO signal at a rate which will effect corresponding changes in field current at a rate which is synchronized to generator frequency, preferably at every cycle of power. This rate is not fixed, as generator frequency is itself variable within controlled preset limits. This scheme of synchronous correction using asynchronously-sampled, fixed interval, generator-voltage sampling and voltage-correction signal computation, together with employment of error-signal integration, and a progressive, fractional error correction scheme, are believed to provide for greater control accuracy and voltage stability than prior art microcomputer based voltage correction arrangements.

A similar scheme of error signal integration combined with progressive, fractional error correction is employed for frequency control of alternator 59. A description of this scheme is set forth below with reference to FIG. 18 and FIG. 19.

Figure 18B:
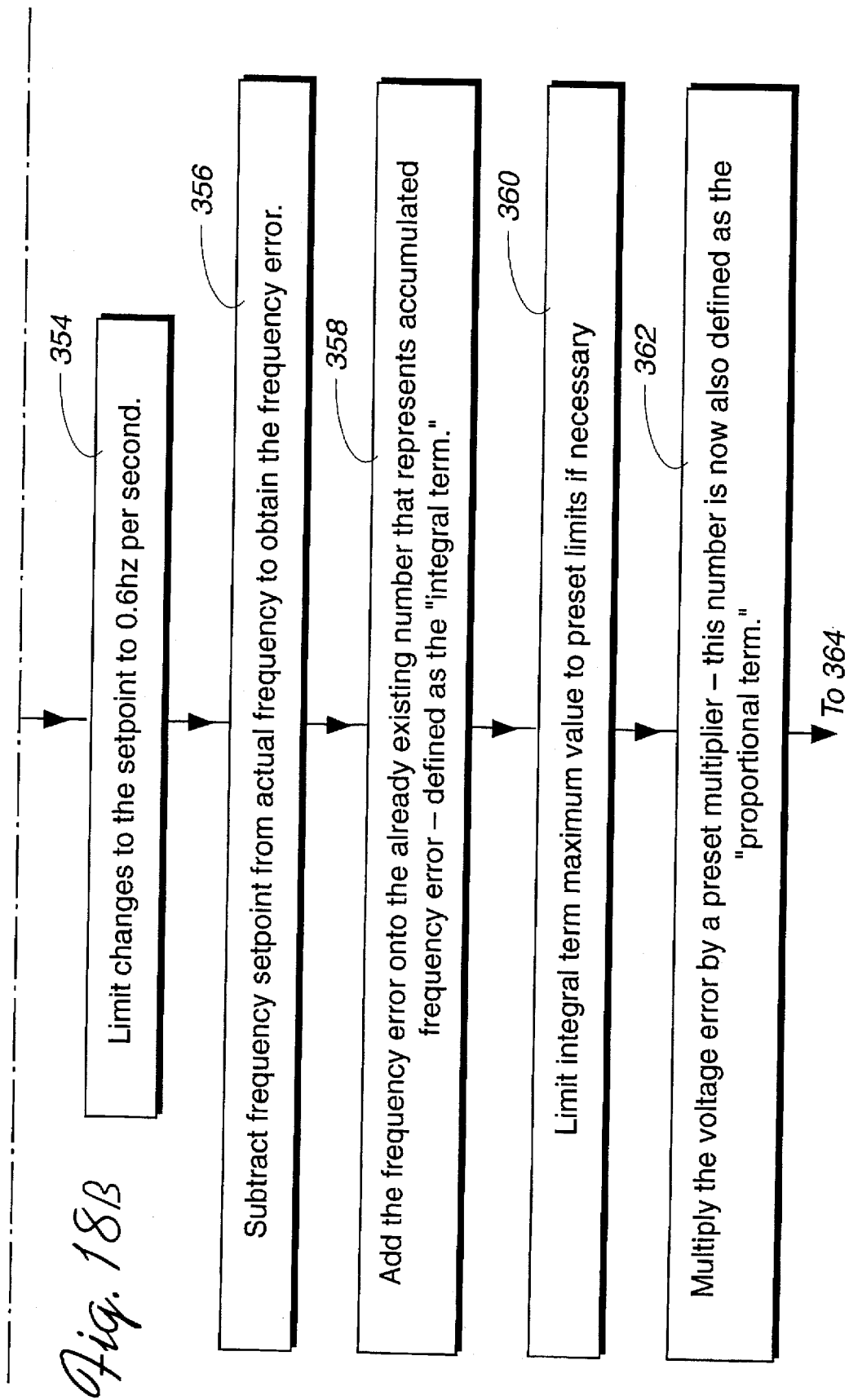
FIG. 18 and FIG. 19 are pseudo-code diagrams schematically representing software architecture for error correction signal computation for frequency regulation in the computer of FIG. 5.

Referring first to FIG. 18, microcomputer 80 first decides which speed (frequency) monitoring source to use for computing an error correction signal (box 350). Two frequency monitoring signals are available to microcomputer 80. One signal is the signal ES see FIG. 4 provided by engine 57 via a magnetic pick up (not shown) and having the form of a pulse train. An advantage of this signal is that it is available whether of not the alternator 59 is producing voltage. The other signal is computed by microcomputer 80 using the mathematical inverse of the measured time between zero-crossings of monitored alternator voltage output. This signal is only available during normal running conditions. Microcomputer 80 also computes the line frequency in this manner for use in synchronization routines discussed above. If either alternator voltage or magnetic pickup frequency ES are below preset values, the magnetic pickup frequency ES is used (if this pick-up device is connected). Otherwise the computer-calculated frequency is used.

Next (box 352), Microcomputer 80 executes one of seven setpoint determining routines depending on the controller operating mode. In the "shut-down" mode there is of, course, no control necessary and the governor actuator is shut down. In the "starting" mode, which is used when cranking, waiting between cranks, and coming up to speed, the frequency control setpoint is set at its full (one-hundred percent) desired value. In the "at-speed" mode, the frequency control setpoint is set at its full value, and fine adjustments are allowed. In the "synchronizing" mode, the frequency setpoint and a relative phase setpoint are set at the monitored line frequency and phase angle.

In the "on-line" mode, the setpoint is set at its full value, plus any fine adjustments required by supervisory control or droop adjustments for power loading or unloading. In the "unloading" mode, the setpoint is set at ninety-eight percent of its full value, which forces load transfer to other generators. In the "cooling-down" mode, the setpoint is set at seventy-five percent of its full value. Any changes in the frequency set point required by changes in mode as discussed above, or by a remote instruction or request, are limited (box 354) to 0.6 Hertz per second (Hz/sec) to avoid too sudden speed changes of engine 57. It should be noted here that as in the case of the above-describe volatge error determining scheme nominal frquency is set at an arbitrary high number, preferably about 20,000 for computation purposes, whatever the generator nominal frequency actually is.

The frequency set point is subtracted from the monitored frequency to determine the frequency error, which may be positive or negative (box 356). The frequency error is added to an existing number that represents accumulated frequency error, and is referred to as an "integral term" (box 358). The integral term is limited to a preset maximum value and minimum values, if necessary (box 360). The frequency error is then multiplied by a constant multiplier, preferably about 0.3, and the result stored as a "proportional term" (box 362).

Continuing now with reference to FIG. 18, without affecting the integral term itself, the integral term is multiplied by a constant multiplier, preferably about 3.0, and the result is added to the proportional term resulting in a "running value") (box 364). Monitored actuator current ACI is added to the running value (box 366). The differential speed term is calculated by calculating the change in speed since the calculation was done the last previous time. For a 1% per second frequency change this value will be about 2.3. The differential term is multiplied by a constant multiplier, preferably 3.0 and added to the running vale (box 368). The resulting running value ACO is now made available to governor controller 84 as a correction signal for setting the actuator current (box 370).

As discussed above an important feature of a controller 64 is that microcomputer 80 therein is self reprogrammable. By self reprogrammable it is meant that the computer may be remotely provided with required modifications to its existing program from central computer 40, and can implement these modifications with only momentary loss of control of some other essential functions of controller 64. One preferred scheme for effecting such a program modification is set forth below.

When reprogramming a computer of a controller is desired, a command is sent from central computer 40 via telecommunications link 39 to the supervisory controller 64, the command indicating which controller's program is to be modified. The supervisory controller instructs that controller to shut down the generator with which it associated and, thereafter, to switch its control mode to a "modify" mode.

In the "modify" mode, NVRAM 106 (see FIG. 6) is first partially erased, and then programming instructions from EPROM 108 are transferred (copied) to NVRAM 106. These transferred programming instructions, including the reprogramming elements here described, continue to be used by microcomputer 80 for operating controller 64. The copy of the instructions is then modified in accordance with instructions transmitted from central computer 40 directly. Once the modifications are complete, the modified copy of the instructions is transferred by processor 100 to EPROM 108. Operation of the computer then proceeds in accordance with the modified instructions stored in EPROM 108, NVRAM is erased to delete the originally transferred instructions, and NVRAM 106 then receives control parameters from the supervisory controller and is ready to begin storage and logging of designated operational variables.

An advantage of the above described reprogramming method is that it is not necessary to transmit a complete set of programming instructions when all that may be required is to make minor changes for example to operating priorities. An operator in central computer 40 has terminal access to the copied instructions in NVRAM 106 as though original code were being modified and may modify that code by keyboard instructions in the usual manner of code editing.

Setpoint and all operating parameters and variable may be adjusted without changing the program itself. If the proper operation is lost accidentally during parameter changes, correct operation may be restored by performing a "factory default reset" from central computer 40. This reestablishes a set of standard setpoint and parameter values.

Throughout the foregoing detailed description of the present invention, reference has been made to central computer 40. Central computer 40 is preferably located in a central management station operated by an entity responsible for managing and servicing generating stations 32. Central computer 40 is preferably programmed, at a minimum level, to transmit to and receive from the current supervisory controller 64 in each of the generating stations, technical maintenance packages of data. These packages may include instructions for switching a controller to the "modify" mode as discussed above for modifying a computer program; instructions to reset or re-initialize a computer; and instructions to restore a set of default variables or setpoints after these have been modified. Central computer 40 receives alarm notifications from supervisory controllers, and has access to all of the contents of the internal memories in any microcomputer 80 in a controller 64. Central computer 40 can thus access all of the logged variables for observing efficiency trends, electrical use patterns and the like. Where, as described above, a microcomputer 80 has only sufficient memory to log a selected group of all of the possible variables monitored or computed by a microcomputer 80, the group to be logged can be selected and changed by central computer 40.

Figure 19:
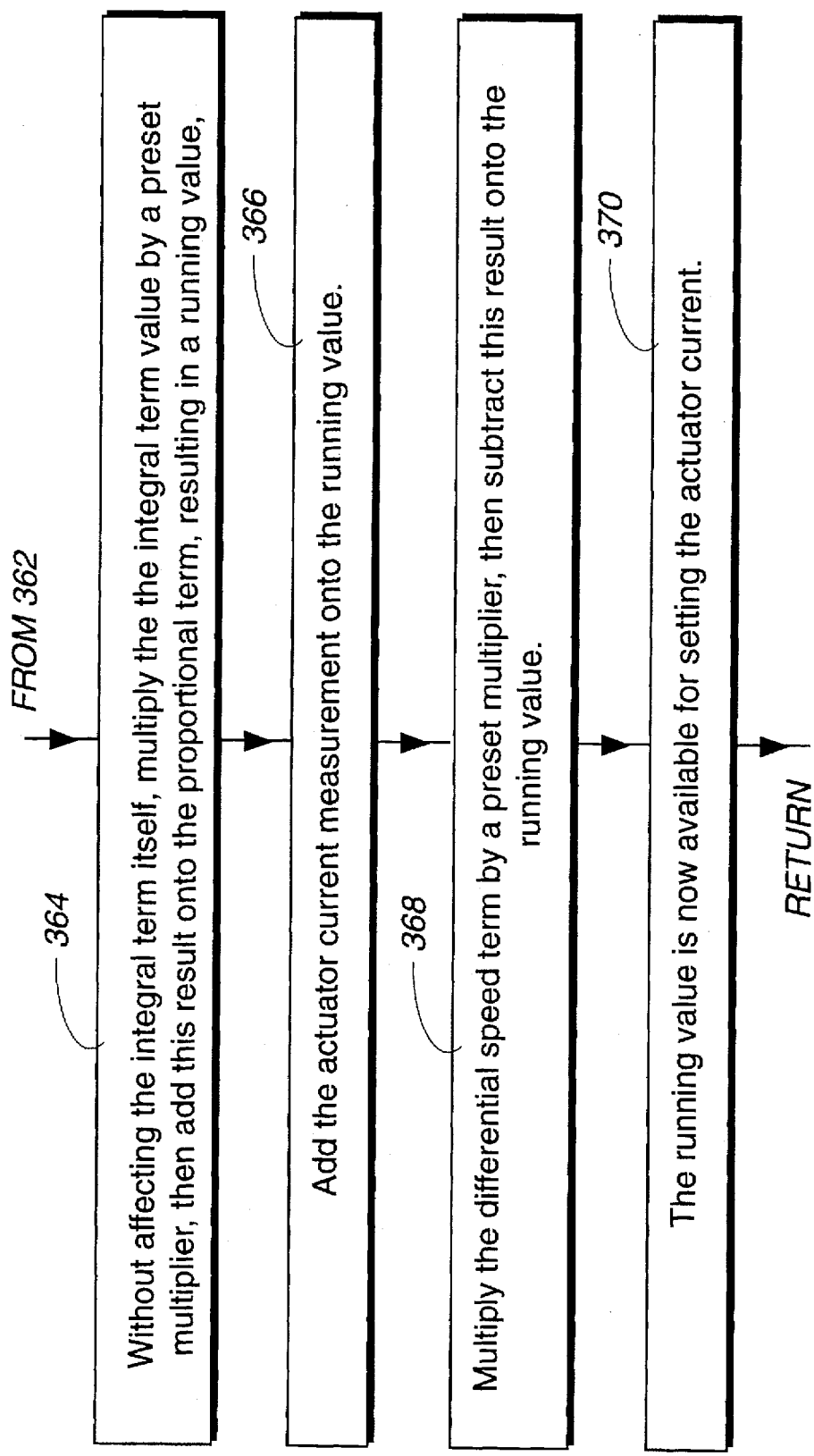
Figure 20:
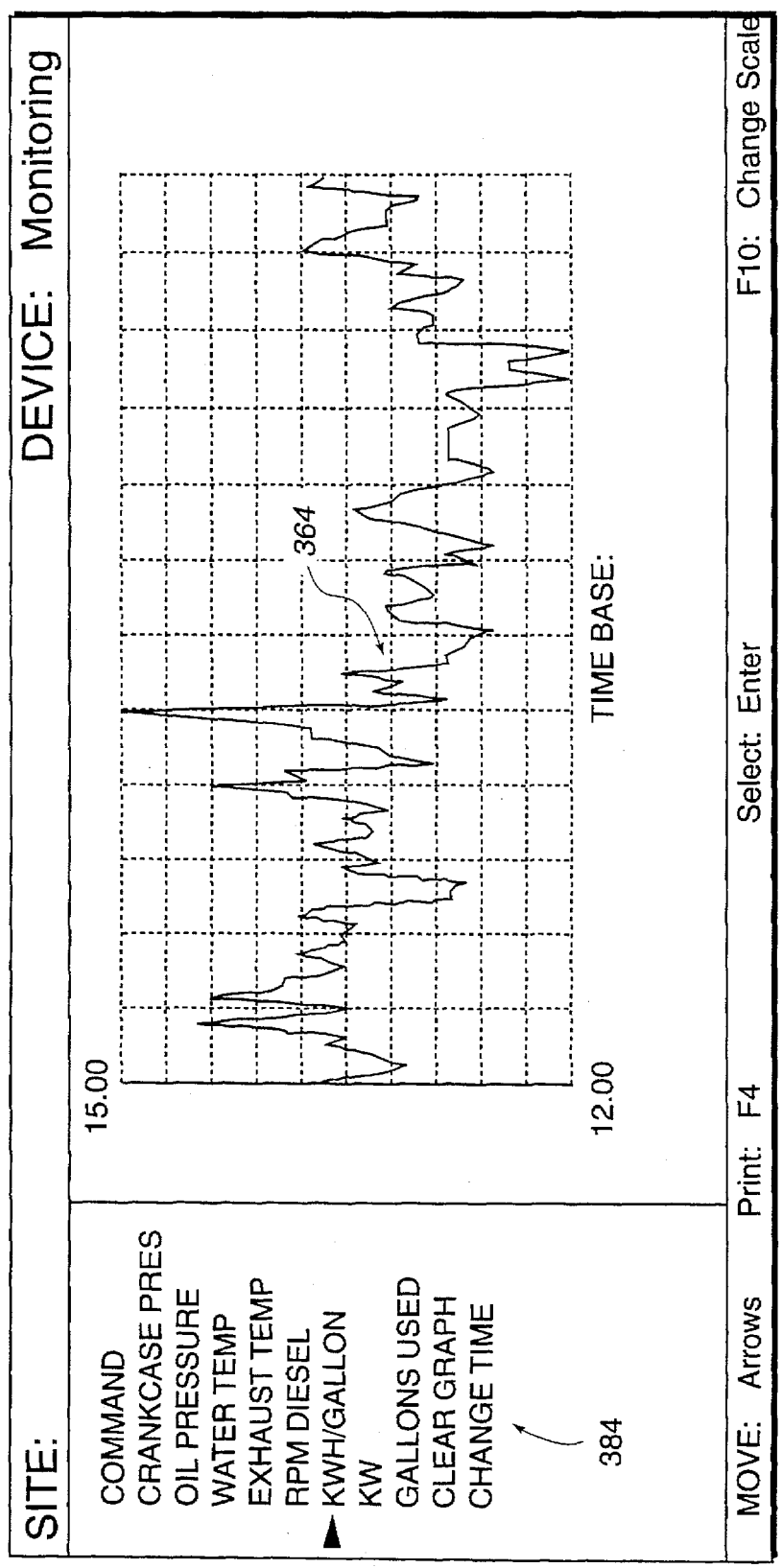
FIG. 20 is a view schematically illustrating one example of a display of the central computer of FIG. 1, the display showing a graph of logged generator efficiency versus elapsed time for a generator of FIG. 3.

In one preferred configuration, computer 40 is programmed to display logged data in a form which can be analyzed by a person operating the computer. In FIG. 19 is depicted one preferred form of a display 380 as it would appear on a cathode ray tube (CRT) monitor screen of central computer 40. Display 380 depicts (curve 382) a generator's efficiency in KWH per gallon over a twenty four hour time period. Generator variables other than efficiency may be displayed by selecting the desired variable from a menu 384.

It will be evident to those skilled in the art to which the present invention pertains that computer 40 may be programmed to analyze trends in logged data and provide performance predictions from such analysis. Those skilled in the art may devise such analysis routines without departing from the spirit and scope of the present invention. Further, those skilled in the art will recognize that the number of variables which may be logged by a generator controller 64 and the number of control functions of a controller 64 are not limited to those described in the above-discussed embodiment of the present invention. The number of logged variables and the number of functions controlled may be increased by increasing memory size, processor speed, and data bus capacity in microcomputer 80 of the controller without departing from the above described operational principles and features of the controller, which are an important aspect of the present invention. Useful in particular would be to provide for automatic or remotely commanded engine control and adjustment functions, for example injector timing. Adding such functions could further reduce the necessity for human intervention in a generating station autonomously controlled in accordance with the present invention.

In summary, a control system and circuits for distributed electrical power generating stations has been described. Each generating station includes a plurality of generators, which together provide power for a user group or community.

Each of the generators includes a computer based controller, the controllers being in electronic communication with each other for cooperatively and autonomously controlling the generator group. An arbitrarily determined one of the controllers assumes a supervisory role in directing the operations of the other controllers at any instant, while the non-supervisory controllers merely monitor the generators with which they are associated. The supervisory controller is in electronic communication with a central computer for reporting performance data thereto and receiving operating instructions therefrom. Should a supervisory controller relinquish the supervisory role for any reason, another controller assumes the supervisory role in a time period sufficiently short that automatic cooperative control of the generators proceeds essentially uninterrupted.

Also described above are novel electronic circuits for providing improved measurements of parameters used for voltage control, frequency control and fuel flow measurement. These circuits, together with novel asynchronous sampling and correction methods of processing the measured parameters and effecting corrections based thereon, are believed to provide greater control accuracy and stability than prior art arrangements for providing such control and measurement.

The system and circuits of the present invention have been described and depicted in terms of preferred and other embodiments. The invention is not limited, however, to the embodiments described and depicted. Rather, the invention is defined by the claims appended hereto.

What is claimed is:

1. In an engine driven electrical power generator arrangement, a method for determining fuel efficiency of electrical energy generation, comprising the steps of:

(a) from a magnetic rotary vane flowmeter providing first and second current pulse signals representing respectively fuel flow to and fuel flow from the engine, said current pulse signals having a frequency representative of volume fuel flow, and having a magnitude representative of fuel temperature;

(b) converting said first and second current pulse signals to first and second voltage pulse signals;

(c) determining from said first and second voltage pulse signals respectively first and second values of fuel volume flow and first and second values of fuel temperature;

(d) from said first and second values of fuel volume flow, said first and second values of fuel temperature and from a predetermined standard temperature, standardizing said first and second fuel volume flows to a density corresponding to said standard temperature; and (e) subtracting said standardized second fuel volume flow from said first standardized fuel volume flow thereby determining a fuel consumption value;

(f) receiving a signal from the generator that the generator has generated a predetermined amount of electrical energy; and (g) calculating the fuel efficiency of electrical energy generation from the fuel consumption value and the predetermined amount of electrical energy.

2. The method of claim 1, wherein any one of said fuel volume flow rates is determined by the steps of (h) recording a highest and a lowest value of said voltage pulses (i) averaging said highest and lowest values of said voltage pulses thereby providing an average voltage value (j) counting a frequency with which said voltage pulses cross said average voltage value, and (k) determining said fuel volume flow from said frequency.

3. The method of claim 2, wherein any one of said first and second fuel temperatures is determined by the step of (l) subtracting said lowest recorded voltage value from said highest recorded voltage value.

\* \* \* \* \*